(12) United States Patent
Holz

(10) Patent No.: US 10,328,578 B2
(45) Date of Patent: Jun. 25, 2019

(54) METHODS AND SYSTEMS FOR DETECTING, RECOGNIZING, AND LOCALIZING PALLETS

(71) Applicant: X Development LLC, Mountain View, CA (US)

(72) Inventor: Dirk Holz, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 146 days.

(21) Appl. No.: 15/494,227

(22) Filed: Apr. 21, 2017

(65) Prior Publication Data

US 2018/0304468 A1    Oct. 25, 2018

(51) Int. Cl.
*G06K 9/00* (2006.01)
*B25J 9/16* (2006.01)
(Continued)

(52) U.S. Cl.
CPC ............ *B25J 9/1697* (2013.01); *B66F 9/00* (2013.01); *B66F 9/063* (2013.01); *B66F 9/0755* (2013.01); *G05B 19/402* (2013.01); *G05D 1/0225* (2013.01); *G05D 1/0248* (2013.01); *G06T 7/13* (2017.01); *G06T 7/75* (2017.01); *G05B 2219/37582* (2013.01); *G05D 2201/0216* (2013.01); *G06T 2207/10028* (2013.01); *G06T 2207/30244* (2013.01); *G06T 2207/30252* (2013.01)

(58) Field of Classification Search
CPC ...... B25J 9/1697; B66F 9/063; G05B 19/402; G05B 2219/37582; G01V 3/02
See application file for complete search history.

(56) References Cited

U.S. PATENT DOCUMENTS 5,812,395 A    9/1998    Masciangelo
6,115,114 A    9/2000    Berg
(Continued)

OTHER PUBLICATIONS

Holz, Dirk et al., "Fast Edge-Based Detection and Localization of Transport Boxes and Pallets in RGB-D Images for Mobile Robot Bin Picking," 47th International Symposium on Robotics, dated Jun. 21, 2016, pp. 1-8.
(Continued)

*Primary Examiner* — Shefali D Goradia
(74) *Attorney, Agent, or Firm* — McDonnell Boehnen Hulbert & Berghoff LLP

(57) ABSTRACT

Example implementations may relate methods and systems for detecting, recognizing, and localizing pallets. For instance, a computing system may receive sensor data representing aspects of an environment, and identify a set of edge points in the sensor data. The computing system may further determine a set of line segments from the set of edge points where each line segment may fit to a subset of the set of edge points. Additionally, the computing system may also filter the set of line segments to exclude line segments that have a length outside a height range and a width range associated with dimensions of a pallet template, and identify, from the filtered set of line segments, a subset of line segments that align with the pallet template. Based on the identified subset of line segments, the computing system may determine a pose of a pallet in the environment.

18 Claims, 13 Drawing Sheets

(51) Int. Cl.
*G05B 19/402* (2006.01)
*B66F 9/06* (2006.01)
*B66F 9/00* (2006.01)
*B66F 9/075* (2006.01)
*G06T 7/73* (2017.01)
*G06T 7/13* (2017.01)
*G05D 1/02* (2006.01)

(56) References Cited

U.S. PATENT DOCUMENTS

| | | | | |
|---|---|---|---|---|
| 7,236,851 | B2 | 6/2007 | Charych | |
| 7,287,625 | B1 | 10/2007 | Harris | |
| 8,849,007 | B2 | 9/2014 | Holeva | |
| 9,025,827 | B2 | 5/2015 | Holeva | |
| 9,635,346 | B2* | 4/2017 | Iida | B66F 9/063 |
| 10,048,398 | B2* | 8/2018 | Rose | G01V 3/02 |
| 2005/0269412 | A1* | 12/2005 | Chiu | G06K 9/4633 |
| | | | | 235/462.03 |
| 2010/0063617 | A1* | 3/2010 | Mori | B23Q 17/20 |
| | | | | 700/175 |
| 2011/0095087 | A1 | 4/2011 | Master | |
| 2011/0216185 | A1* | 9/2011 | Laws | H04N 7/18 |
| | | | | 348/121 |
| 2011/0218670 | A1 | 9/2011 | Bell | |
| 2014/0277691 | A1* | 9/2014 | Jacobus | G06Q 10/087 |
| | | | | 700/216 |

OTHER PUBLICATIONS

Baglivo, L. et al., "Autonomous Pallet Localization and Picking for Industrial Forklifts: A Robust Range and Look Method; Autonomous Pallet Localization and Picking for Industrial Forklifts," Measurement Science and Technology, IOP, Brisotol, GB, vol. 22, No. 8, dated Jul. 7, 2011, 11 pages.

Varga, Robert et al., "Robust Pallet Detection for Automated Logistics Operations," Proceedings fo the11th Joint Conference on Computer Vision, Imaging and Computer Graphics Theory and Applications, dated Jan. 1, 2016, 10 pages.

Bellomo, N. et al., "Palelt Pose Estimation with LIDAR and Vision for Autonomous Forklifts," Proceedings of the 17th World Congress the International Federation of Automatic Control, Seoul, Korea, dated Jul. 6-11, 2008, 6 pages.

International Search Report issued in co-pending International Patent Application No. PCT/US2018/022358, European Patent Office, dated Jun. 4, 2018, 6 pages.

Written Opinion issued in co-pending International Patent Application No. PCT/US2018/022358, European Patent Office, dated Jun. 4, 2018, 13 pages.

Besl, Paul J. "A Method for Registration of 3-D Shapes." IEEE Trans. on Pattern Analysis and Machine Intelligence. Los Alamitos, CA, USA; IEEE Computer Scoiety. 14(2): 239-256.

Choi, A. Trevor and Christensen. RGB-D edge detection and edge-based registration. In Proc. of the IEEE/RSJ International Conference on Intelligent Robots and Systems (IROS), pp. 1568-1575, 2013.

May, Droeschel, Holz, Fuchs, Malts, Nuchter, and Hertzberg (2009). "Three-Dimensional Mapping with Time-of-Flight Cameras." Journal of Field Robotics (JFR), Special Issue on Three-dimensional Mapping, Part 2. vol. 26, issues 11-12, pp. 934-965.

Arya, Mount, Netanyahu, Silverman, WU. "An Optimal Algorithm for Approximate Nearest Neighbor Searching in Fixed Dimensions." Jounral of the ACM, vol. 45, No. 6, pp. 891-923.

Muja and Lowe, "Fast Approximate Nearest Neighbors with Automatic Algorithm Configuration", in International Conference on Computer Vision Theory and Applications (VISAPP'09), 2009.

Segal, Haehnel, and Thrun, "Generalized-ICP", In Robotics: Science and Systems, 2009.

Elseberg, Magnenat, Siegwart, Nuechter, "Comparison of nearest-neighbor-search strategies and implementations for efficient shape registration.", Journal of Software Engineering for Robotics (JOSER), 3(1), pp. 2-12. 2012.

\* cited by examiner

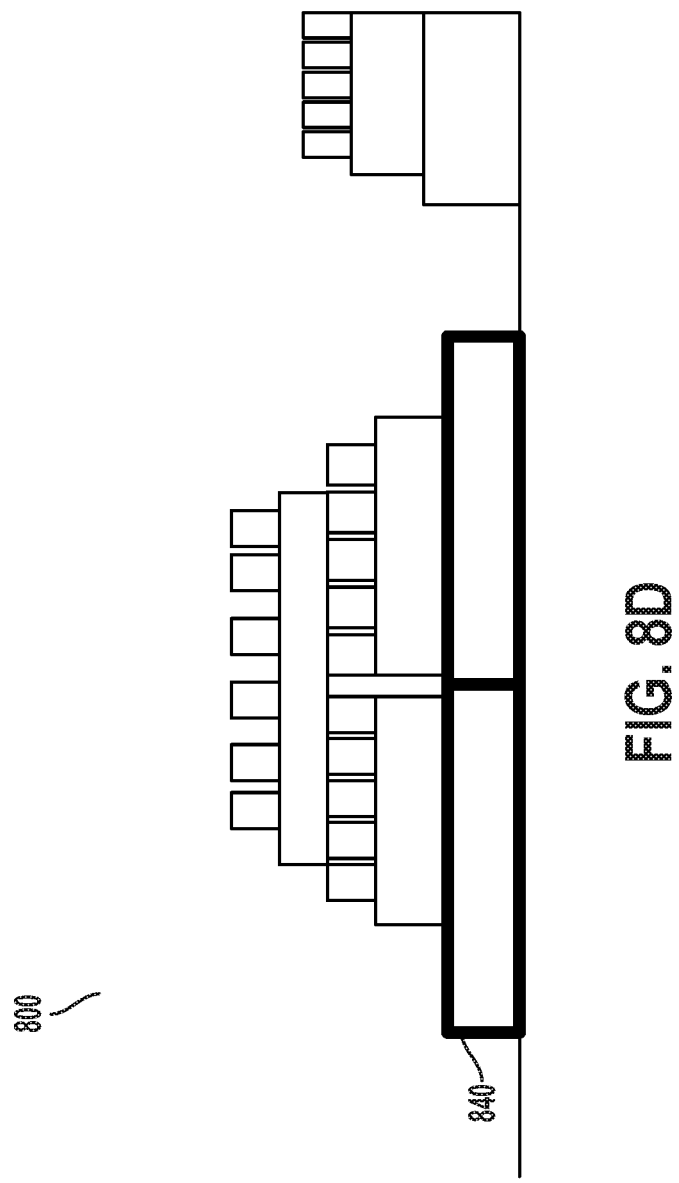

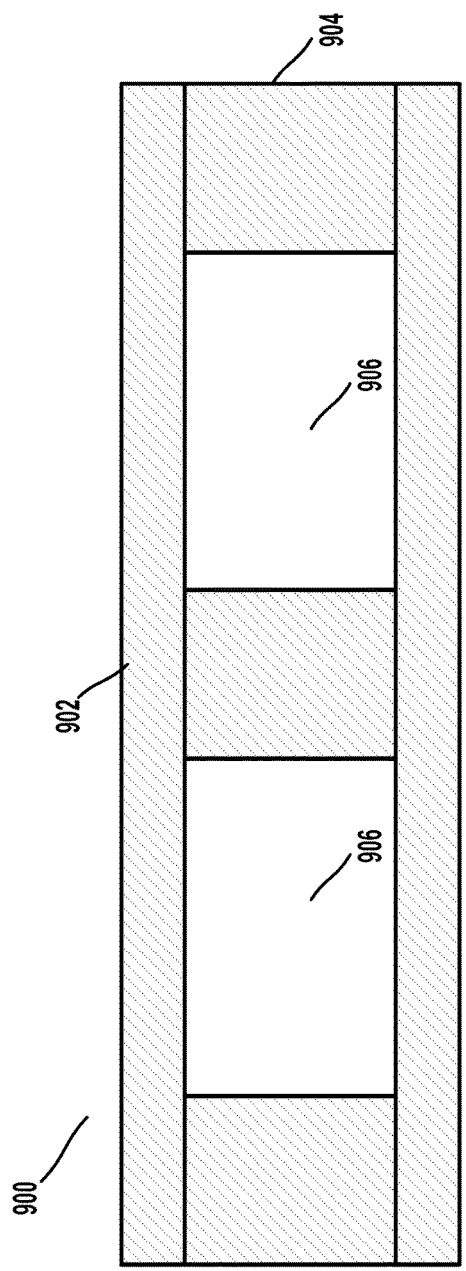
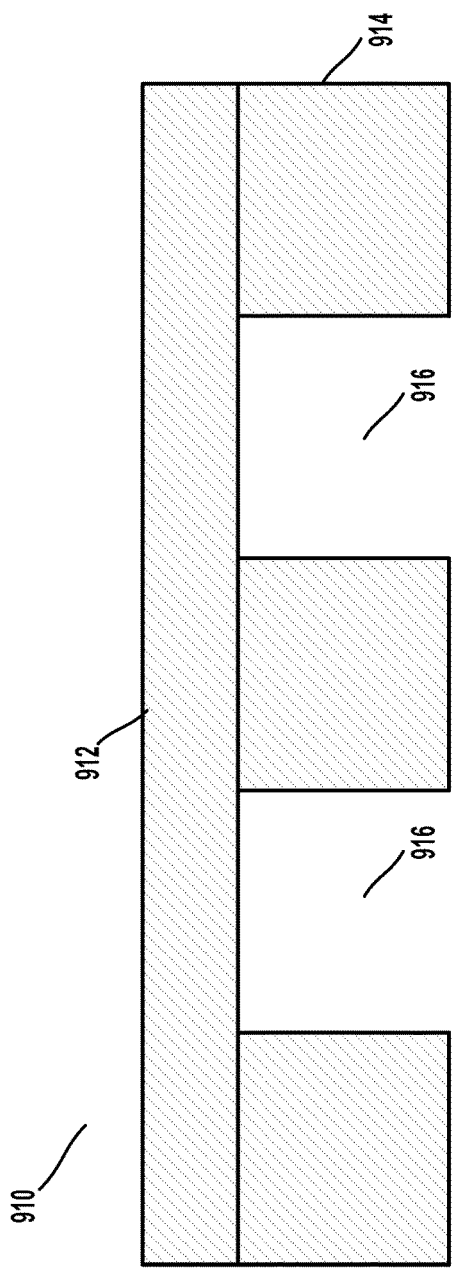
FIG. 9A
FIG. 9B

METHODS AND SYSTEMS FOR DETECTING, RECOGNIZING, AND LOCALIZING PALLETS

BACKGROUND

Commercial entities, such as manufacturers, wholesalers, and transport businesses, often use warehouses to store items, such as raw materials, parts or components, packing materials, and finished products. A warehouse can enable the organization of items through use of pallets and pallet racks to store numerous pallets holding various items in a manner that permits for easier access and efficient processing. As such, a warehouse may use various types of pallets, which are flat transport structures configured to hold items for transportation by vehicles and other equipment operating in the warehouse.

Traditionally, human operators may operate machines, vehicles, and other equipment within the warehouse. For instance, a human operator may navigate a forklift to lift and transport pallets between a delivery area and storage. However, with continuous advancements in sensors, computing power, and other technologies, companies are switching to autonomous and semi-autonomous vehicles for performing operations within warehouses rather than relying on human operators.

SUMMARY

Example implementations relate to methods and systems for detecting, recognizing, and localizing pallets, which may involve a computing system utilizing sensor data representing aspects of an environment from a sensor system to identify data points that likely represent edges of surfaces in the environment. The computing system may further fit a set of line segments onto sets of identified edge points and determine a subset of the set of line segments that align with dimensions of a pallet template. Additionally, the computing system may determine a pose of a pallet in the environment relative to the sensor using the subset of line segments.

In one aspect, an example method is provided. The method may include receiving, at a computing system from a sensor of a robotic device, sensor data representing aspects of an environment, and identifying a set of edge points in the sensor data. The method may also include determining a set of line segments from the set of edge points. In particular, each line segment may fit to a subset of the set of edge points. The method may further include filtering the set of line segments to exclude line segments that have a length outside a height range and a width range associated with dimensions of a pallet template. The method may also include identifying, from the filtered set of line segments, a subset of line segments that align with the pallet template, and determining a pose of a pallet in the environment based on the identified subset of line segments.

In another aspect, an example robotic device is provided. The robotic device may include a sensor coupled to the robotic device and a control system configured to receive sensor data representing aspects of an environment from the sensor, and identify a set of edge points in the sensor data. The control system may also identify a set of line segments from the set of edge points. In some instances, each line segment is fit to a subset of the set of edge points. The control system may also filter the set of line segments to exclude line segments that have a length outside a height range and a width range associated with dimensions of a pallet template. The control system may also identify, from the filtered set of line segments, a subset of line segments that align with the pallet template, and determine a pose of a pallet in the environment based on the identified subset of line segments.

In a further aspect, a non-transitory computer readable medium is provided. The non-transitory computer readable medium has stored therein instructions executable by a computing system to cause the computing system to perform operations. The operations may include receiving sensor data representing aspects of an environment from a sensor, and identifying a set of edge points in the sensor data. The operations may also include determining a set of line segments from the set of edge points. In some instances, each line segment is fit to a subset of the set of edge points. The operations may also include filtering the set of line segments to exclude line segments that have a length outside a height range and a width range associated with dimensions of a pallet template. The operations may further include identifying, from the filtered set of line segments, a subset of line segments that align with the pallet template, and determining a pose of a pallet in the environment based on the identified subset of line segments.

In yet another aspect, a system is provided. The system may include means for detecting, recognizing, and localizing pallets in depth images. In particular, the system may include means for receiving sensor data representing aspects of an environment from a sensor of a robotic device, and means for identifying a set of edge points in the sensor data. The system may also include means for determining a set of line segments from the set of edge points. In some instances, each line segment is fit to a subset of the set of edge points. The system may further include means for filtering the set of line segments to exclude line segments that have a length outside a height range and a width range associated with dimensions of a pallet template. The system may additionally include means for identifying, from the filtered set of line segments, a subset of line segments that align with the pallet template, and means for determining a pose of a pallet in the environment based on the identified subset of line segments.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 8D illustrates a visualization of a subset of line segments that align with the pallet template identified by a computing system, in accordance with an example embodiment.

FIG. 9A illustrates an example pallet template.

FIG. 9B illustrates another example pallet template.

DETAILED DESCRIPTION

Figure 1:
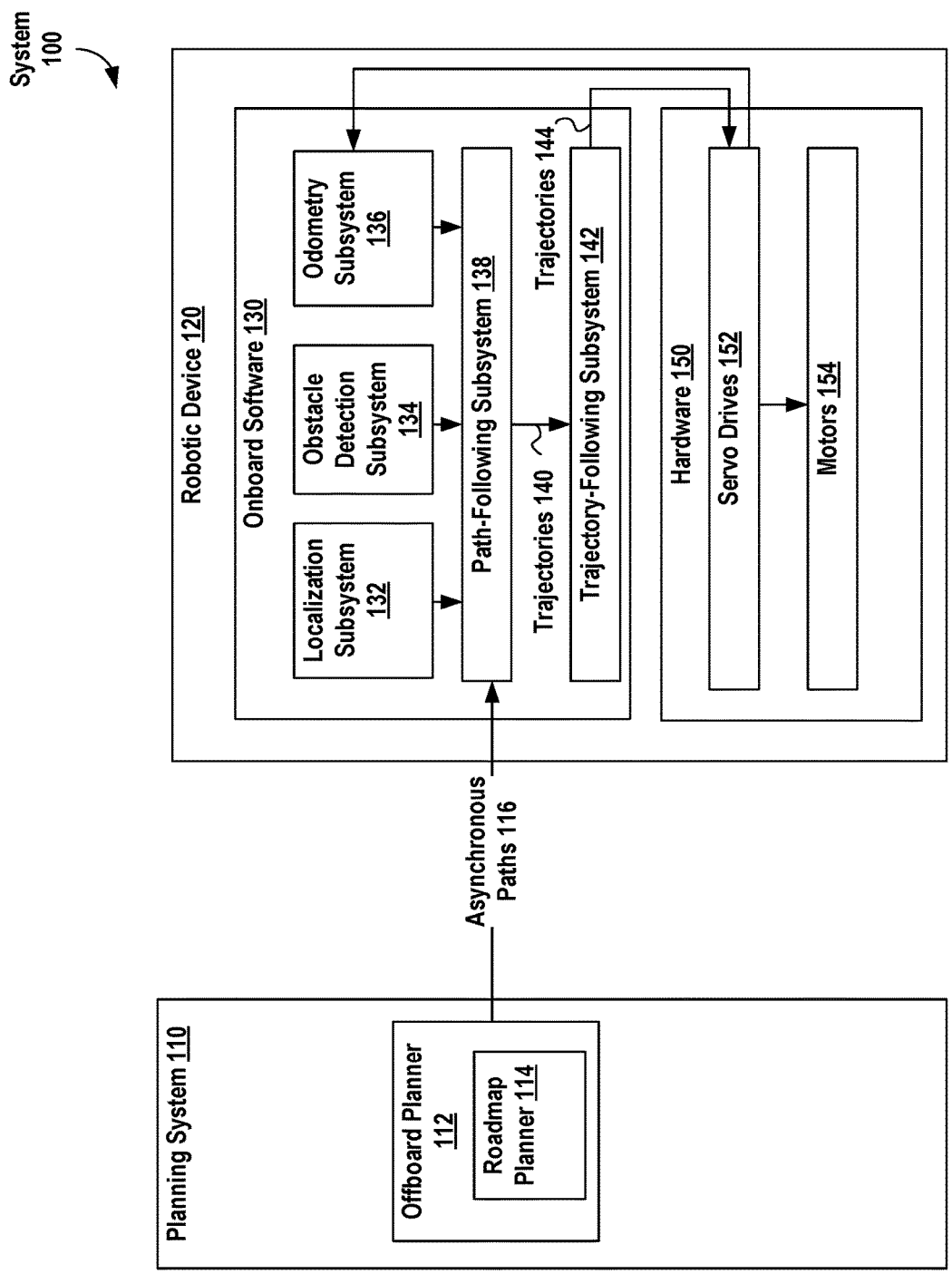
FIG. 1 is a block diagram of a system, in accordance with an example embodiment.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features.

The example implementations described herein are not meant to be limiting. It will be readily understood that aspects of the present disclosure, as generally described herein, and illustrated in the figures, can be arranged, substituted, combined, separated, and designed in a wide variety of different configurations, all of which are explicitly contemplated herein.

I. OVERVIEW

A robotic device also referred to herein as vehicle, robot, robotic system, device, etc., may perform various operations within a warehouse or another type environment. For instance, an example robotic device may be a forklift configured to lift and move pallets in the space. Many situations that occur within a warehouse or similar setting may require robots to precisely navigate to enable safe and efficient transportation of a pallet. To illustrate, a forklift may need to accurately measure the pose of a targeted pallet in the environment to be able to successfully insert its tines into the pallet's pockets without damaging the pallet or the items positioned on the pallet.

In practice, various methods may be used to locate a pallet. Some methods may require robots to be able to operate within a highly structured environment since the structure of the environment allows each robot to utilize knowledge about precise locations of pallets when performing operations. In such an environment, a robot may receive instructions that specify both the location of a targeted pallet (e.g., a pick up location) and the drop off location for the pallet. A highly structured environment, however, often requires maintenance that is logistically difficult to preserve, especially when numerous vehicles are performing operations in a dynamic manner. By relying on knowledge of the structure of the environment, a robot often may be limited in the amount of operations that it can perform. Further, in some situations, it may be advantageous to deploy robots in an unstructured environment and still have the robots safely and efficiently locate and transport pallets.

Example implementations for detecting, recognizing, and localizing pallets described herein may enable the detection of pallets without reliance on prior knowledge of the structure of the environment. More specifically, some implementations presented herein aim to enable a computing system to utilize sensor data representative of a robot's environment in order to determine the pose of a targeted pallet (i.e., the position and orientation of the targeted pallet within the environment). After determining the pose of a targeted pallet, the computing system may develop a control strategy that can enable the robot to properly engage and lift the pallet regardless of whether the pallet is located in a structured or unstructured environment.

Examples may involve a computing system initially acquiring sets of sensor data depicting an environment from a robot's sensor system, which may include various types of sensors, such as depth sensors (e.g., 3D camera), RADAR, and LIDAR. For instance, a computing system may analyze sensor data in a point cloud where data points represent the positions (e.g., height, distance) of object's surfaces in the environment relative to the robot. The computing system may analyze clusters of data points in the point cloud to determine information regarding the surface(s) that the data points were measured from, including determining a position, height, and distance away of the surface(s). Similarly, the computing system may receive sensor data in the form of depth images that contain pixels (e.g., data points) that indicate the distances and heights of measured surfaces relative to the robot's sensor system.

In further examples, the robot's sensor system may provide additional information that can supplement the point cloud data, such as color images with pixels conveying differences in color among the different surfaces in the environment. As such, the computing system may be configured to use incoming sensor data to identify data points that likely are edge points, i.e., data points in the sensor data that likely represent edges of surfaces in the environment.

In some implementations, the computing system may be configured to perform one or multiple pre-processing operations on incoming sets of sensor data to help facilitate a subsequent edge point identification process. For instance, an example pre-processing operation may involve the computing system determining the local surface normals of one or multiple clusters of data points. In particular, a local surface normal of a cluster of data points may indicate a vector perpendicular to a surface that is represented by the cluster of data points. For example, the local surface normal for a cluster of data points measured from a flat, ground surface is directed upward. The local surface normal can provide information regarding changes in the structure of a surface. Other examples of pre-processing operations can include the computing system determining the curvature and/or covariance of clusters of data points in the sensor data. The computing system may use the curvature and covariance to identify convex and concave edges where different surfaces in the environment meet without depth discontinuities.

In some examples, the computing system may determine the curvature and the covariance of data points by selecting a data point and finding local neighborhood points of that data point (e.g., a cluster of surrounding data points). For instance, the local neighborhood of data points around a given point may include all data points within a certain radius from the selected data point. The computing system may further perform an Eigen value decomposition where Eigen vector corresponding to the smallest Eigen value is used as an approximation of the surface normal for the selected data point. The computing system may further fit a plane through the local neighborhood of data points and use the plane normal as the normal for the selected data point.

As part of potential pre-processing operations, the computing system may remove some data points from a set or sets of incoming sensor data based on the amplitudes of the data points. Cameras or other types of sensors may measure the distance to points by the time (or phase) difference between an emitted and received light pulse (or wave). In particular, the amplitude of a data point may indicate the "strength" of the received signal, i.e., the amplitude may indicate how reflective a measured surface is. Darker surfaces may appear darker than lighter surfaces in the above measurements. For instance, a highly reflective surface will likely appear brighter. As such, the computing system may filter incoming sets of sensor data based on amplitudes or strengths of reflectivity of data points within the sensor data. For instance, the computing system may remove data points with amplitude values less than a minimum amplitude threshold ($a_{min}$) or greater than a maximum amplitude threshold ($a_{max}$) (i.e., outside a desired amplitude range). The computing system may remove data points with amplitude values less than $a_{min}$ since those data points may not have a measured strength that allows clear analysis. Similarly, the computing system may remove data points with amplitude values greater than $a_{max}$ since those data points may reflect off too highly of a reflective surface that likely do not represent portions of a targeted pallet.

Additionally, in some examples, a computing system may also filter data points based on the heights of the data points (e.g., the value of the data points in the 'Z' in the Cartesian coordinate system). In particular, the height of a data point may represent the distance of the data point above a reference plane (e.g., a ground surface). The computing system may be configured to filter data points in sets of sensor data based on the data points' heights based on the typical use of pallets, which are usually flat, elongated structures often positioned on the ground and holding items on top. Since the computing system may be configured to estimate the presence of pallets at certain heights, the computing system may remove the data points that have heights less than a minimum height threshold ($h_{min}$) or greater than a maximum height threshold ($h_{max}$) (i.e., heights outside a desired height range) since these data points likely do not represent portions of a targeted pallet. The minimum height threshold ($h_{min}$) may be used to remove data points that likely represent the ground surface from other data points having higher heights that likely represent objects, such as the targeted pallet, items positioned on the pallet, etc. Similarly, the maximum height threshold ($h_{max}$) may be used to remove data points that are positioned at a height above the ground that the pallet likely would not be positioned since a targeted pallet may likely be a flat structure positioned on the ground. By removing data points that were measured from surfaces positioned at certain heights that likely do not correspond to a pallet, the computing system may perform edge point identification on less edge points overall and use less computational resources and time.

As indicated above, the computing system may be configured to process incoming sensor data in order to identify data points that are likely edge points (e.g., the borders of surfaces in the environment). In some examples, the computing system may identify edge points in sets of sensor data using a Canny edge detection process or other available edge identification processes. A Canny edge detection process may involve a multi-step process to utilize sensor data configured in gray scale image format and produce an image that shows the positions of measured intensity discontinuities (e.g., interruptions in the structure of a surface or surfaces in the environment). The Canny edge detection process or other potential processes may enable the computing system to analyze incoming sensor data and identify edge points that likely represent edges of object surfaces. In some examples, the computing system may utilize additional information during edge point identification, such as color information. For instance, when the computing system receives color images depicting the environment, the computing system may process the color images by converting the color images into grayscale images prior to performing a Canny edge detection process on the grayscale images.

In another implementation, the computing system may identify edge points by examining local neighborhoods of data points (e.g., clusters of data points) and marking the data points as belonging to an edge if the distance (or difference) in the depth-coordinates exceeds a threshold max distance ($d_{max}$). The computing system may analyze clusters of data points (e.g., local neighborhood of a selected data point) or gradient images and measure for large changes. In particular, data points on the same surface may likely have similar distance, curvature, and normal orientation (small angle between normal). Similarly, the computing system may analyze gradients for changes. For instance, two perpendicular walls may convey similar differences and gradients everywhere except where the two planes intersect. As such, the computing system may analyze for these types of changes to find data points measured from edges between two surfaces.

In some cases, the computing system may identify data points as edge points if the data points are within a local neighborhood of data points with considerably different surface normal orientations (e.g., large angle between different normals) or if the local curvature exceeds a maximum threshold curvature ($c_{max}$). The different surface normal orientation and/or local curvature can assist the computing system to identify changes in measured surfaces that likely result from measurements of one or multiple edges of the surfaces. The curvature may correspond to measurements of how likely a data point is an edge point. For instance, the curvature may indicate how large the local surface(s) around the data point change. As such, the computing system may be configured to adjust the thresholds used to assist in edge point identification within examples. In an example implementation, the computing system may identify an edge point by computing the angle between two surface normal and determining that the angle is large (e.g., exceeds a threshold angle). The computing system may further analysis differences in neighborhoods of data points to account for noise. For instance, a plane further away from the sensor may express large angles between normal due to noise in the distance measurements.

After identifying edge points in incoming sets of sensor data, the computing system may be configured to fit line segments to sets of edge points in a manner that results in each line segment fitting to a subset of the set of edge points. In some cases, the computing system may determine that a line segment fits a set of edge points by performing an iterative process. For example, the computing system may sample two points (e.g., point p and point q) from the identified edge points and determine a potential line model that extends between the points. The line model, for instance, may be represented by a position vector p corresponding to sample point p and a difference vector q−p determined via a difference between point q and point p. After determining the potential line model, the computing system may analyze the distances of other edge points from the line model in order to identify edge points that are positioned within a threshold distance from the line model. Further, after identifying the line model that yields the largest number of inlier data points, the computing system may use all the inlier data points to further refine the line model by fitting a line to all the inlier data points. In effect, the computing system may associate edge points positioned nearby the line model (i.e., within the threshold distance) as part of the line model and further determine that the line model likely represents an edge of an object's surface in the environment. For instance, the computing system may be configured to determine line models that maximize the number of inlier data points fitting each line model. The computing system may repeat the above process to determine a set of line segments that fit various sets of edge points in the sensor data.

As indicated above, the computing system may perform the process numerous times in order to determine a set of line segments that fit the different clusters of identified edge points. While performing the process, the computing system may be configured to remove edge points associated with a determined line segment from the set of candidate edge points that may be analyzed to determine additional line segments. The computing system may continue to use and modify the set of candidate edge points until the computing system is unable to determine any more line segments (e.g., not enough edge points available).

In some example implementations, the computing system may be configured to filter the set of determined line segments to exclude any line segment that has a length outside a height range and a width range associated with dimensions of a pallet template. The computing system may filter the line segments based on the dimensions of the pallet template to remove line segments that have lengths that indicate the line segments are likely not measurements of the targeted pallet in the environment. For instance, the computing system may filter the set of line segments to remove line segments that are too short or too long to represent a pallet's edge, such as borders extending along the face of the pallet (e.g., front portion of the pallet) or inner pockets of the pallet. In further examples, the computing system may determine an orientation of a given line segment (e.g., vertical or horizontal orientation) in the set of line segments and then compare the length of that line segment to either the height range (e.g., center or side vertical dimensions of a pallet template) or the width range (e.g., top or bottom horizontal dimensions of the pallet template) depending on the determined orientation of the line segment. For instance, the computing system may compare a vertically-oriented line segment to a range that is based on the vertical dimensions of the pallet template to determine whether to remove the line segment. Similarly, the computing system may compare a horizontally-oriented line segment to a range that is based on the width dimensions (e.g., width of pallet and width of pockets) of the pallet template to determine whether to remove the line segment.

In some examples, the computing system may be configured to compare line segments using ranges associated with one or more pallet templates that have some error tolerance. For instance, the width range may be the width of one or more pallet templates plus or minus a fixed error tolerance. Similarly, the height range may be the height of one or more pallet templates plus or minus a fixed error tolerance.

To finalize locating the targeted pallet in the environment, the computing system may identify, from the filtered set of line segments, a subset of line segments that align with the pallet template. The computing system may be configured to compare one or multiple pallet templates to the filtered set of line segments in order to identify line segments (if any) that express a relationship that appear to represent the front face of a pallet. In some examples, the computing system may use an Iterative Closest Point process or other registration process(s) to match points of a pallet template to points of a subset of the line segments. For instance, during an iteration of the process, the computing system may aim to minimize the difference between data points of the line segments and points positioned along the dimensions of the pallet template. The computing system may use a non-linear registration process that may determine a 3D position (e.g., is the pallet on the ground or a shelf), and a 2D rotation on the plane on which the robot is navigating.

At this point, the computing system may use the subset of line segments to determine a pose of the targeted pallet in the environment, which may indicate the position and orientation of the pallet relative to the robotic device. In some implementations, the computing system may provide the pallet's pose to the robot's control system, which may use the pose to determine a control strategy for the robot. For instance, the control system may cause the robot to change orientation and/or position relative to the pallet prior to further causing the robot to engage and lift the pallet. In another example, the computing system may develop a control strategy for the robotic device using the pallet's pose. As a result, the computing system may provide instructions to the robot's control system to execute in order to complete the determined control strategy.

In a further example, the computing system may also determine a confidence based on the alignment between the subset of line segments and the dimensions of the pallet template. In particular, the computing system may determine a higher confidence when the alignment signals that the subset of line segments match accurately with the dimensions of the pallet template. The computing system may be configured to proceed to determine a control strategy and/or relay the pallet's pose to the robot's control system when the confidence level is high. On the other hand, a low confidence may arise when the alignment signals that the subset of line segments do not fit accurately with the dimensions of one or more pallet templates. For instance, the line segments may not match the model dimensions associated with a pallet template (e.g., the pallet template is minimally wider, longer, or shorter). If this is the case, the computing system may be configured to repeat the process in order to attempt to determine line segments that more accurately align with the pallet template. The computing system may also determine a lower confidence when the subset of line segments and pallet template match well, but the registration or alignment places the subset of line segments minimally off the correct pose of the pallet. The computing system may measure overlap between the pallet template (transformed with respect to the pose of the pallet) and the actual scene of the pallet recorded by the camera. If the pose or the dimensions of the pallet differs, the resulting confidence may be lower. In some cases, the computing system may attempt to use different pallet templates to match points of the pallet templates to a subset of determined line segments after determining a low confidence during a pose determination given process. The computing system may determine data points from the pallet template match points of the line segments when the threshold distance between are below a threshold distance.

II. SYSTEM DESIGN FOR ROBOTIC DEVICES

FIG. 1 is a block diagram of system 100, in accordance with an example embodiment. System 100 includes planning system 110 and robotic device 120. Planning system 110 can include offboard planner 112 that can coordinate motions of one or more robotic devices operating in an environment. Offboard planner 112 may include roadmap planner 114 such that offboard planner 112 and/or roadmap planner 114 may generate one or more asynchronous paths 116 for a robotic device (e.g., robotic device 120) to follow in an environment.

A roadmap graph, prototype graph, or other roadmap representative of an environment, such as prototype graph 300 discussed below in the context of FIG. 3, can be received, determined, or otherwise provided to planning system 110, offboard planner 112 and/or roadmap planner 114. Asynchronous paths 116 can be one or more paths developed based on one or more of the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

In some examples, robotic device 120 can be any one or more steered vehicle(s) capable of following a path. For example, robotic device 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. As such, onboard software 130 may include additional software systems in other examples.

Localization subsystem 132 represents a system capable of localizing a robotic device. In other words, localization subsystem 132 may enable location determination of the robotic device with respect to an environment. For instance, localization subsystem 132 can generate position estimates of the robotic device and/or other objects that can be used to localize the robotic device and assist the robotic device in following a desired path (e.g., asynchronous paths 116), and/or assist the robotic device in following a trajectory (e.g., trajectories 140). Once the position estimates are generated, localization subsystem 132 can provide the position estimates to path-following subsystem 138.

An asynchronous path, or path for short, can be a time-invariant plan or other information indicating how robotic device 120 may travel from a starting point (SP) to an ending point (EP); i.e., an (asynchronous) path does not take time into account. In contrast, a trajectory can include values of a steering angle and of traction motor velocity that robotic device 120 can follow for a planning time interval.

The planning time interval can be a duration of time during which a robotic device is guided, or planned, to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point (SP) to an ending point (EP) in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servomechanisms and related electrical equipment. In some examples, servo drives 152 can include one or more electronic amplifiers used to power the one or more servomechanisms and/or to monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) of servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
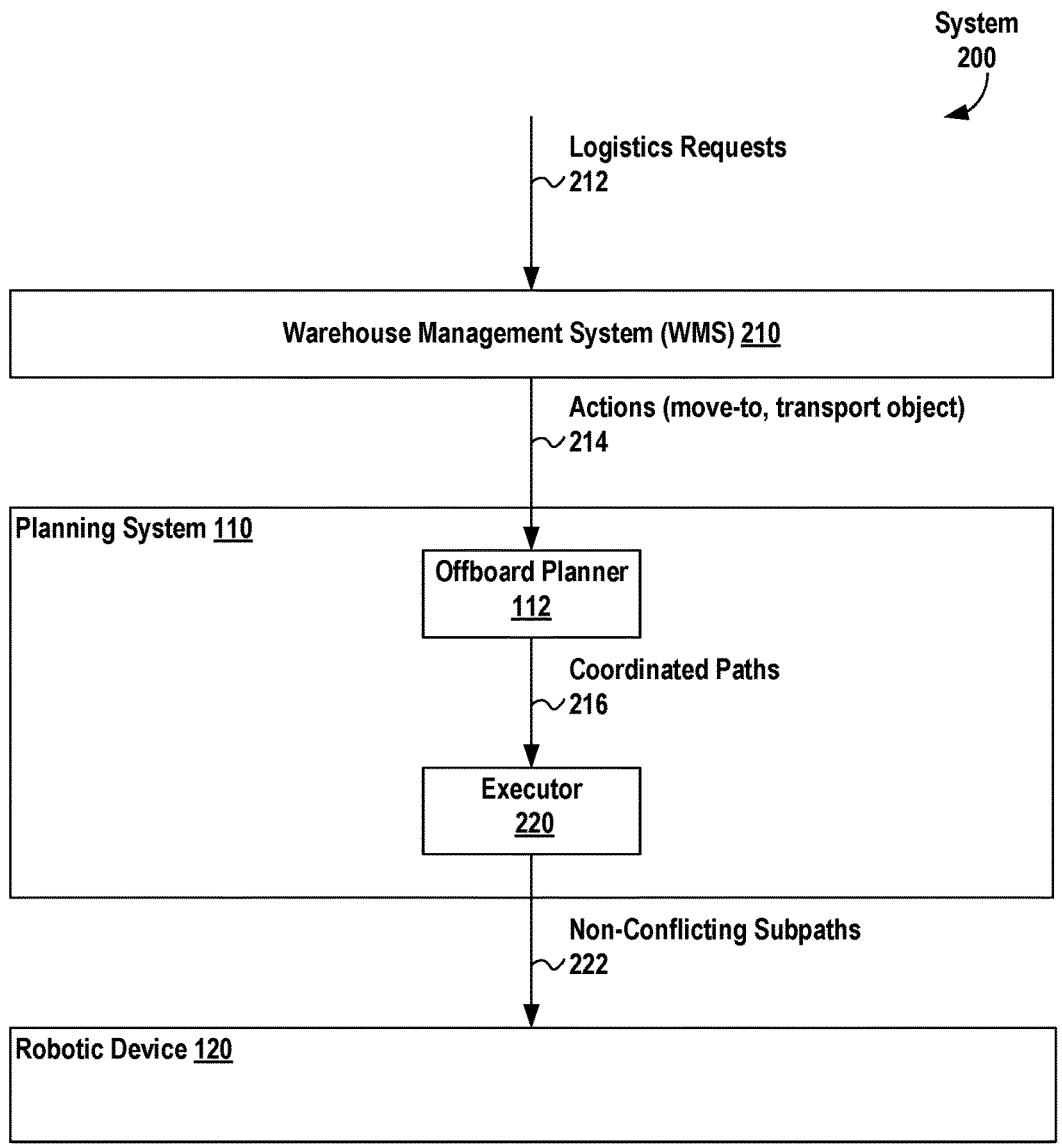
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 220. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can include go-to commands of the form {agent ID, destination}, but other actions are possible such as "move pallet". These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck; for example, any Occupational Safety and Health Administration (OSHA) Class 1 or Class 3 powered industrial truck. In other embodiments, planning system 110 can includes software that executes using one or more networked computing devices located in the "cloud" (e.g., one or more networked computing devices) and/or located somewhere on a premises co-located with robotic device 120.

Figure 3:
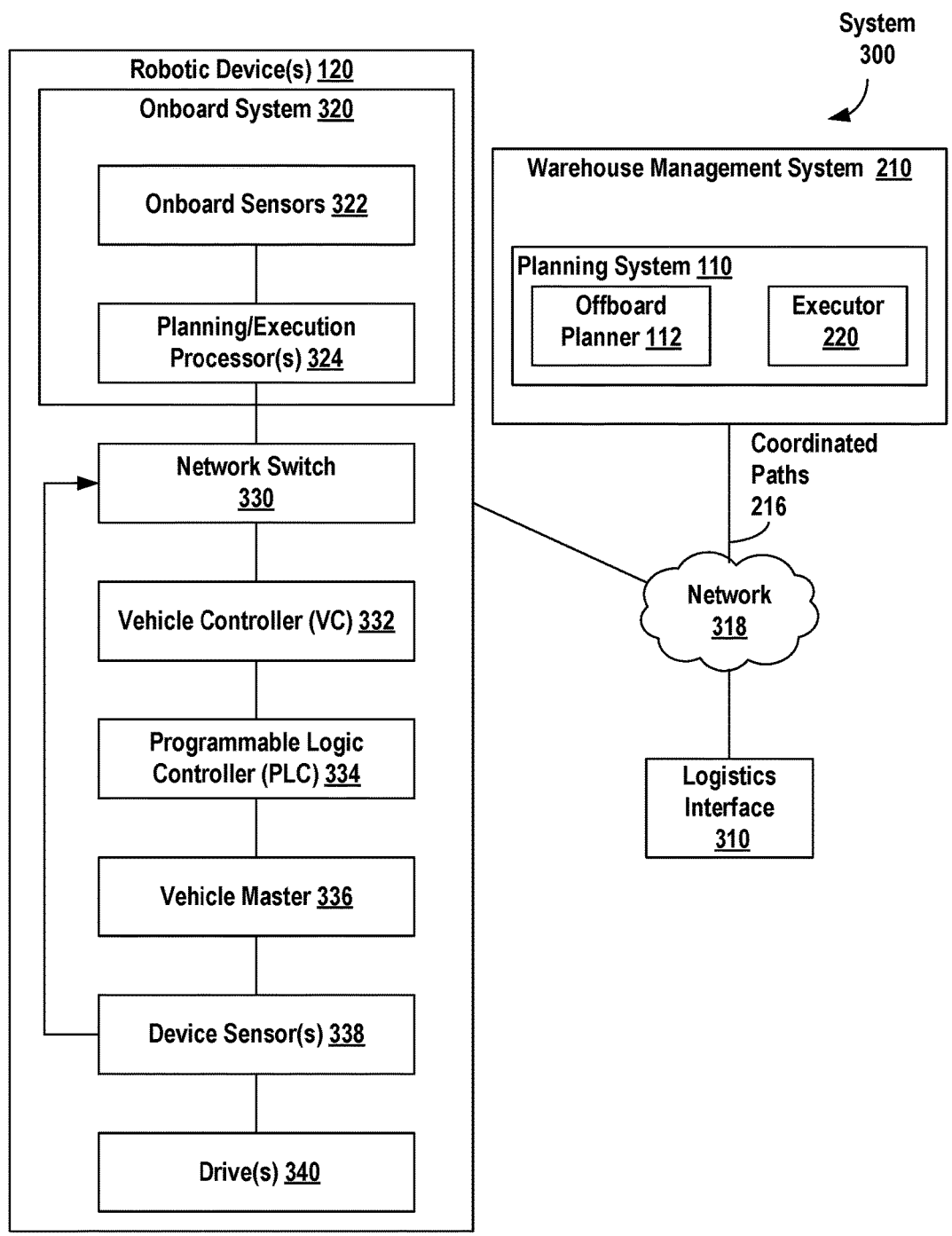
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to move pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1 and 2.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g., presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/ or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 that is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost:: signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g., device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
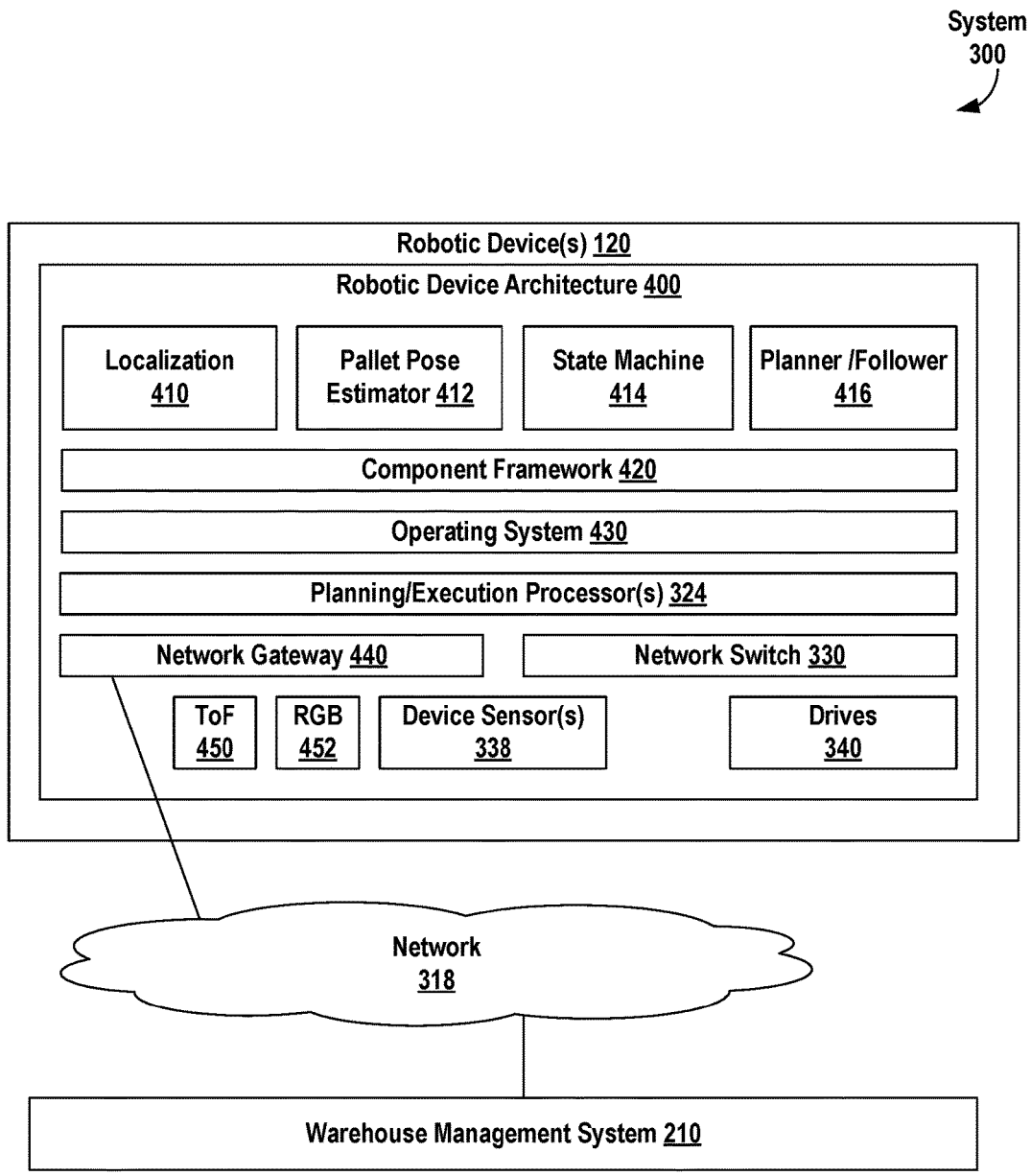
FIG. 4 illustrates robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
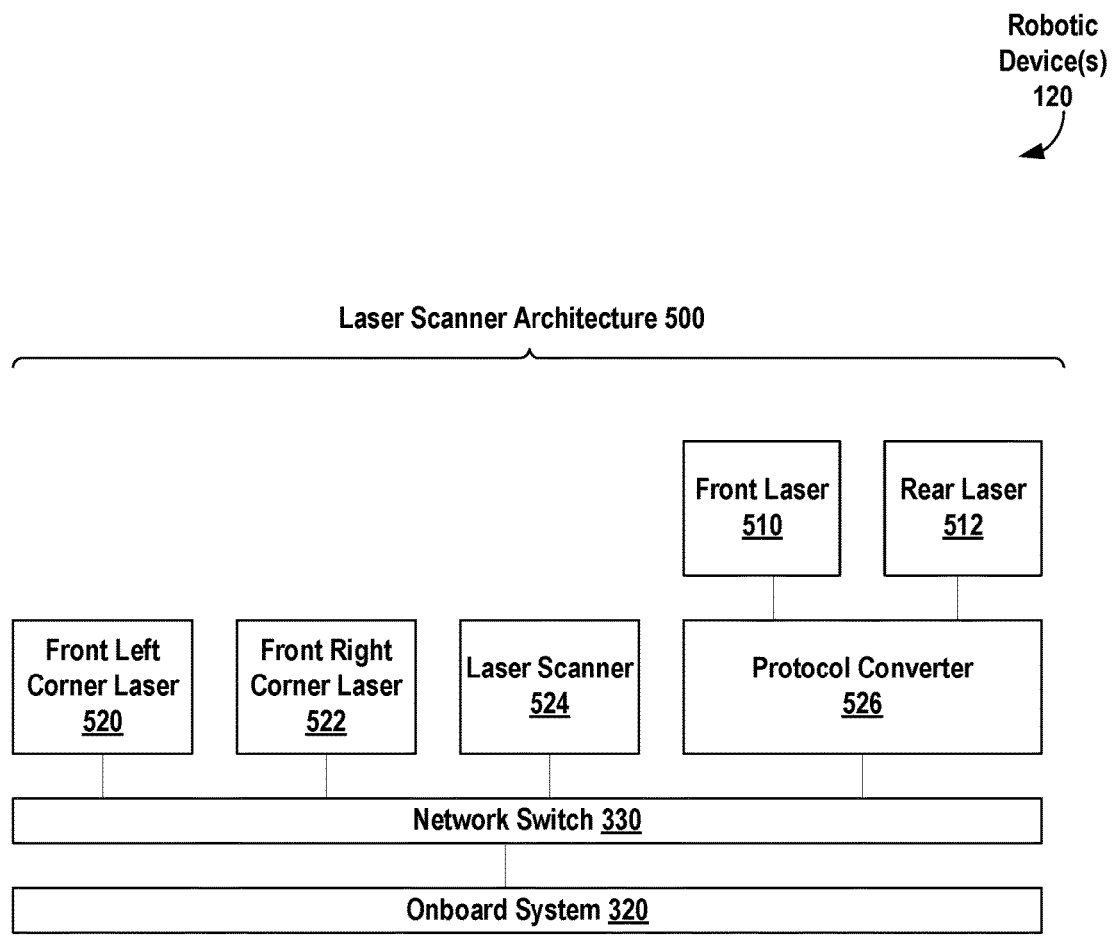
FIG. 5 illustrates laser scanner architecture for one or more robotic devices, in accordance with an example embodiment.

FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 1 below.

TABLE 1

| Name | Summary | Recovery Strategy |
| --- | --- | --- |
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |

TABLE 1-continued

| Name | Summary | Recovery Strategy |
| --- | --- | --- |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. EXAMPLE SYSTEMS AND METHODS

Figure 6:
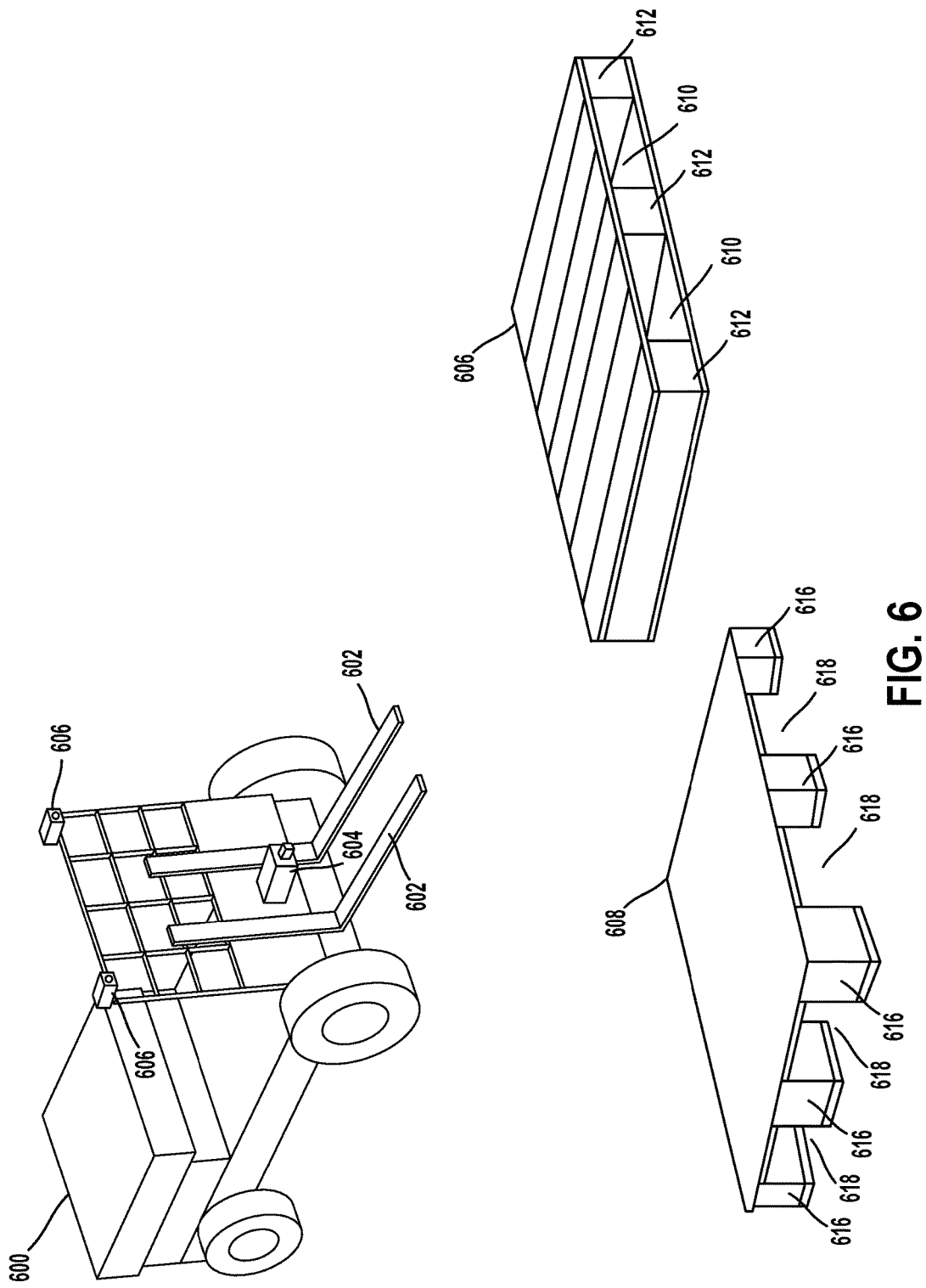
FIG. 6 shows an example autonomous fork truck near two pallets.

FIG. 6 illustrates robotic device 600 deployed in a worksite that includes pallets, according to an exemplary embodiment. As shown, robot 600 is a forklift configured with two tines 602 for lifting and transporting pallets (e.g., pallets 606, 608), and sensor 604. Robot 600 may perform operations in an autonomous or semi-autonomous mode using sensor data from sensor 604 and cameras 606, which can all have various positions on robot 600 within examples.

Sensor 604 represents a sensor system configured to provide measurements of the environment of robot 600. For instance, sensor 604 may be a 3D camera system (e.g., stereo camera system) configured to provide depth images containing range data. In some instances, sensor 600 may represent multiple cameras arranged at known locations on robot 600 to enable range imaging via stereo triangulation. In a further example, sensor 604 may be a time-of-flight camera system configured to resolve distances using the known speed of light and measuring the time-of-flight of a light signal between the camera and the subject (e.g., the targeted pallet) for each point of the image. To further elaborate, a time-of-flight camera is a type of scannerless LIDAR that captures an entire scene with each laser or light pulse rather than capturing measurements via a point-by-point process like a typical, scanning LIDAR.

Cameras 606 may provide additional information that can supplement measurements of the environment captured by sensor 604. For instance, cameras 606 may be visual cameras (e.g., RGB cameras) that can capture color images of the environment.

As further shown in FIG. 4, robot 600 is positioned relative to pallet 606 and pallet 608, which are included to illustrate example configurations of pallets that robot 600 may locate and engage (e.g., lift and transport). Pallets 606, 608 represent two types of pallets, but other examples can exist in different structures, materials, and sizes. As such, pallet 606 is a two way entry pallet with two pockets 610 separated by stringers 612 and located on opposing sides of pallet 606. In order to securely engage and lift pallet 606 without causing potential damage, robot 600 may insert tines 602 into pockets 610 prior to securely lifting pallet 606. Serving as another example, pallet 608 represents a four way entry pallet with pockets 618 on each of side. This arrangement allows robot 600 to engage and lift pallet 608 from any side since blocks 416 provide support to objects placed on pallet 608 while also creating numerous pockets 618.

While operating in an environment with one or more pallets, robot 600 may initially detect and locate pallets (e.g., pallets 606, 608) using onboard sensors (e.g., sensor 604, camera 606). For example, a computing system providing control instructions to robot 600 may detect the potential presence of pallet 606 using camera images, RADAR, LIDAR, and/or other types of sensors coupled to robot 600. After the preliminary detection of a potential pallet in the environment, the computing system may further acquire and utilize sensor data to locate pockets 610 of pallet 606 to enable accurate insertion of tines 602. For example, the computing system may process incoming sets of sensor data to detect data points that represent edges of objects in the environment and further fit lines to the detected edge points.

The computing system may then filter the determined line segments to exclude line segments that are much longer or shorter than the dimensions of the pallet template (i.e., the height and width of the pallet's front face) and perform a matching process that attempts to align a pallet template to a subset of the line segments. If the computing system determines a subset of line segments that appear to align with the pallet template, the computing system may analyze the relationship of the subset of line segments to determine a six degree-of-freedom pose of a pallet in the environment. The computing system may use the pallet's pose to develop instructions for robot 600 to use to locate and move the pallet.

Figure 7:
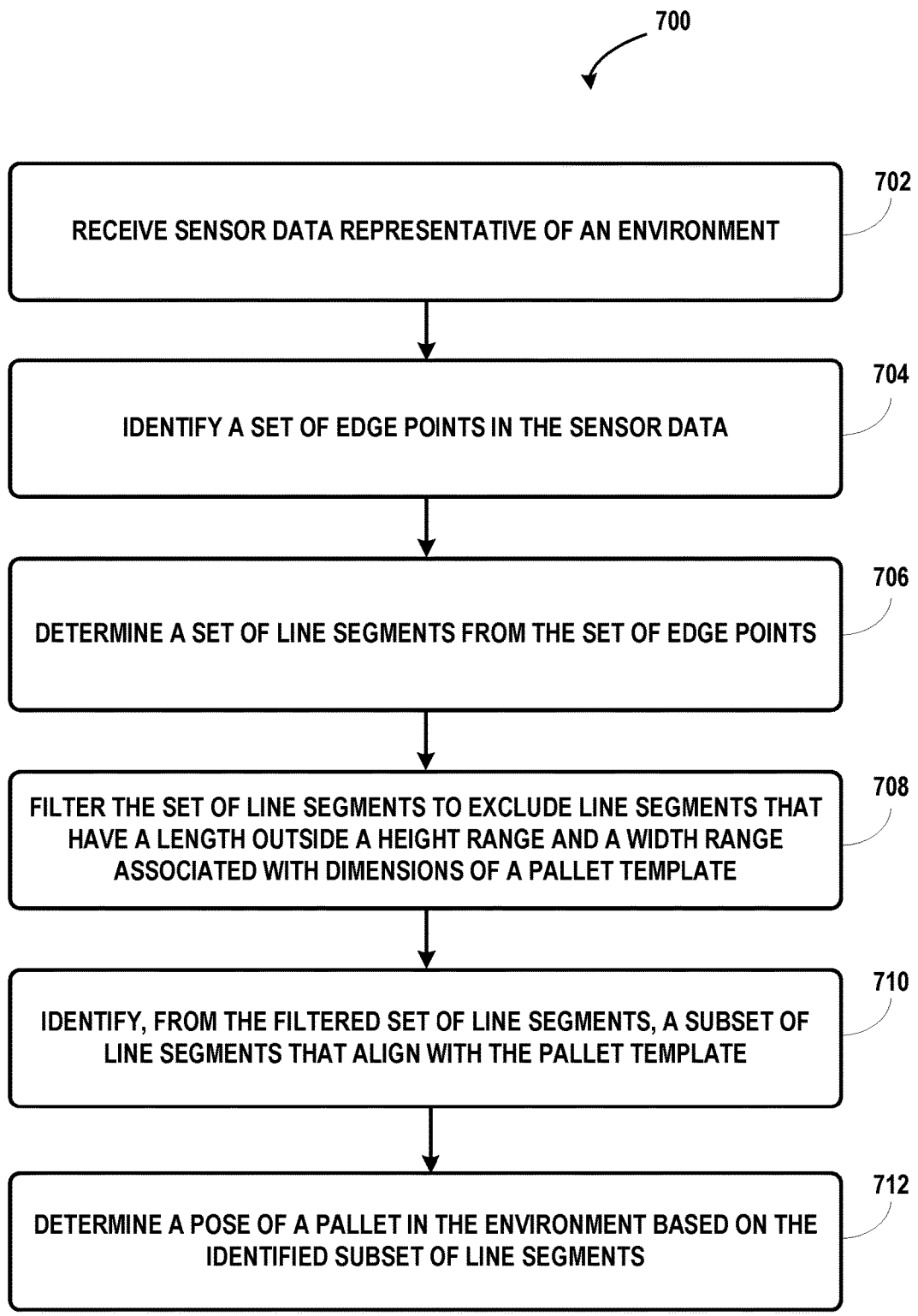
FIG. 7 is a flowchart that shows an example method for detecting, recognizing, and localizing pallets.

FIG. 7 is a flowchart illustrating a method 700, according to an example implementation. Particularly, method 700 may be implemented to detect and locate pallets in an environment. For instance, a computing system may perform method 700 to detect, recognize, and locate a pallet in near a robot device (e.g., robotic device 600).

Method 700 (and other processes and methods disclosed herein) presents a method that can be implemented within an arrangement involving, for example, robotic device(s) 120 (or by components or subsystems thereof, such as by a processor and a non-transitory computer-readable medium having instructions that are executable to cause the device to perform functions described herein). Additionally or alternatively, method 700 may be implemented within any other arrangements and systems.

Method 700 and other processes and methods disclosed herein may include operations, functions, or actions as illustrated by one or more of blocks 702, 704, 706, 708, 710, and 712. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems and may be considered a computer readable storage medium, for example, or a tangible storage device. In addition, for the method 700 and other processes and methods disclosed herein, each block in FIG. 7 may represent circuitry that is wired to perform the specific logical functions in the process.

At block 702, method 700 may include receiving sensor data representing aspects of an environment. For instance, a computing system, such as the robot's control system or a remotely positioned system, may receive sensor data representative of the environment from the robot's sensor system. The computing system may receive the sensor data from a laser scanner, depth sensor, LIDAR, or other types of sensors. In some examples, the sensor data may be received from a sensor coupled to a robot or other type of vehicle. For instance, the sensor may be coupled to an autonomous or semi-autonomous forklift robotic device. In other examples, the sensor data may be received from a sensor coupled to another apparatus, such as a manual device or stand.

In some instances, the computing system may analyze the sensor data in a point cloud data format that represent aspects of the physical environment near the robot via data points arranged in a coordinate system (e.g., Cartesian coordinate system). In particular, the data points may convey the position, height, and other parameters of surfaces in the environment. In another example, the computing system may analyze incoming sensor data in a 2D format, such as depth images.

In some cases, the computing system may receive information that can supplement incoming sets of sensor data, such as color images that have pixels conveying the color of surfaces in the environment. As such, the computing system may analyze differences in colors to differentiate among data points that correspond to different objects. In some examples, the computing system may process position information of incoming sets of sensor data along with color information to further understand and analyze the robot's environment. As such, the computing system may utilize other sensor information to assist in determining a targeted pallet's pose within examples. In further examples, the computing system may receive sensor data in various forms. For instance, the computing system may receive depth images, color images, etc.

At block 704, method 700 may include identifying a set of edge points in the sensor data. To initiate pallet detection using incoming sets of sensor data, the computing system may identify data points in the sensor data that likely correspond to edges of surfaces in the environment. In particular, these data points may be edge points that represent the borders at which different surfaces in the environment terminate. For instance, some of the identified edge points may represent a targeted pallet's outside borders or extend along edges of the inner pockets of the pallet. Likewise, other edge points may represent the borders of other surfaces, such as the edges of objects positioned on the pallet, other nearby pallets, etc. As such, the computing system may identify data points in sensor data that likely correspond to edges of the target pallet, objects on the pallet, nearby pallets, and other possible surfaces in the environment.

In some examples, the computing system may use an edge point detection process on multiple incoming sets of sensor data to reduce potential errors that may arise from noise or other characteristics that may occur within a single set of sensor data. For example, the computing system may compare edge point identification results across multiple sets of sensor data. This way, the computing system may filter potential errors that may arise using a single set of sensor data.

In an example implementation, the computing system may receive images with data points that express the amplitudes (e.g., height of the signal received by the sensor) of measured surfaces in the environment. The amplitudes may indicate the reflectivity of the measured surfaces. Prior to identifying edge points within the images, the computing system may initially remove all or a portion of data points that express an amplitude smaller than $a_{min}$ or larger than $a_{max}$. In particular, $a_{min}$ may correspond to a minimum amplitude threshold level and indicate that the represented surface is below certain strength of reception. The computing system may remove the data points that fall below $a_{min}$ since those data points likely were measured from dark surfaces that likely do not correspond to portions of a targeted pallet.

Similarly, $a_{max}$ may correspond to a maximum amplitude threshold level and indicate that the surface represented by data points that are above $a_{max}$ likely do not correspond to a pallet since pallets typically have materials that would not produce measurements of high amplitudes. Further, the computing system may filter data points based on amplitudes to remove data points corresponding to surfaces that cause erroneous measurements and may be more noise than other data points. After removing data points that have amplitudes outside a desired range, the computing system may utilize the remaining points to identify edge points. The computing system may filter incoming sensor data points based on amplitudes to reduce runtime and other computational resources by focusing subsequent processing on areas in the sensor data.

In some examples, the computing system may identify edge points using a Canny edge detection process, which may involve (i) applying a Gaussian filter to smooth an image (e.g., depth measurements) to remove noise within the measurements, (ii) detecting intensity gradients of the image, (iii) applying a non-maximum suppression to remove spurious responses to edge detection, (iv) applying a double threshold to determine potential edges, and (v) detecting edges by hysteresis, such as finalizing the detection of edges by suppressing all of the other edges that are weak and not connected to strong edges. For instance, the computing system may initially smooth sensor data using Gaussian convolution, which may be a two-dimensional (2D) convolution operator that is used to 'blur' images and remove detail and noise. Convolution is an operation that is associated with many sensor data processes and provides information for feature detecting. The degree of smoothing using the Gaussian smoothing may be determined by the standard deviation of the Gaussian, which may output a 'weighted average' of each data point's neighborhood with the average weighted more towards the value of central data points within the neighborhood. Although the computing system may also use a mean filter rather than Gaussian, the Gaussian convolution may provide a gentler smoothing and help preserve edges better.

After smoothing the sensor data using Gaussian filter, the Canny edge detection process may involve using a simple 2D first derivative operator to highlight clusters of data points with high first spatial derivatives. In particular, edges may give rise to ridges in the gradient magnitude image with the Canny edge detection process measuring the top of the ridges and setting other data points to a zero value that are not part of the ridges tops. This may result in a thin line in the output through a process known as non-maximal suppression. The process may further determine hysteresis as controlled by two thresholds: a first threshold and a second threshold, with the first threshold greater than the second threshold. The process may analyze data points on a ridge higher than the first threshold in both directions from the initial point until the height of the ridge falls below the second threshold. This hysteresis helps to ensure that noisy edges are not broken up into multiple edge fragments. In other examples, the computing system may perform a Canny edge detection process involving different steps than the process described above. Further, in some examples, the computing system may also perform other edge detection processes, such as a Sobel edge detector process.

Figure 8A:
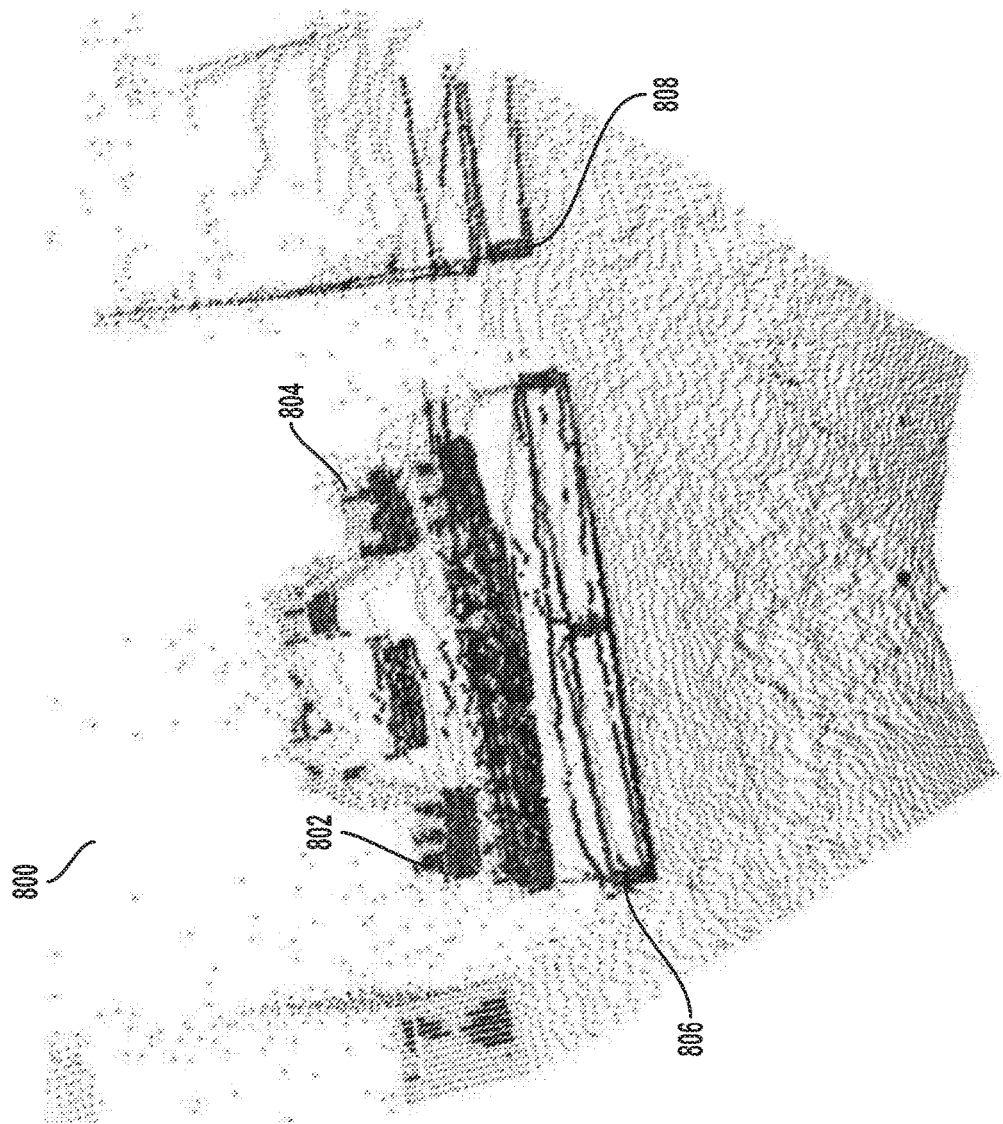
FIG. 8A illustrates a visualization of edge points identified in sensor data by a computing system, in accordance with an example embodiment.

FIG. 8A illustrates a visualization of edge points identified in sensor data by a computing system, in accordance with an example embodiment. In particular, sensor data 800 is shown in a point cloud that depicts the surfaces of objects in front of a robot (e.g., robot 600). As such, a computing system may identify edge points, such as a first cluster of edge points 802, a second cluster of edge points 804, a third cluster of edge points 806, and a fourth cluster of edge points 808, among other edge points identified in sensor data 800. The identified edge points may correspond to edges of various surfaces in the environment, such as the edges of objects, edges of a targeted pallet, and other surfaces. As discussed above, the computing system may have identified the different edge points as a result of using a Canny edge detection process and/or other edge detection processes.

In a further example, the computing system may perform multiple edge detection processes using the sensor data. For instance, the computing system may use a line segment detector (LSD) on color images along with a Canny edge detect process. LSD represents a linear-time line segment detector that may give subpixel accurate results on images without parameter tuning.

Referring back to FIG. 7, method 700 at block 706 may include determining a set of line segments from the set of edge points. In particular, each line segment may fit to a subset of the set of edge points. For example, each line segment may include a number of edge points that approximately align to form the line segment with the number of edge points varying across examples. In some cases, the computing system may determine that a longer line segment includes more edge points that appear to form portions of the line segment. Similarly, the computing system may determine that a short line segment fits a fewer number of edge points. In some cases, however, a shorter line segment may include a large number of detected edge points that may enable the computing system to identify the line segment as a potential edge of a surface quickly.

In some implementations, the computing system may apply an iterative approach to determine line segments that fit to edge points. For instance, the computing system may sample at least a first edge point (p) and a second edge point (q) from among identified edge points and determine a line model that connects the sample edge points, which may be represented by a position vector p and the difference vector q−p. The computing system may further utilize the line model to analyze the distances of other nearby edge points relative to the line model to identify edge points that may likely fit the line model. For instance, in some applications of the approach, the computing system may consider edge points as part of the line model when the edge points have distances to the line model less than a threshold distance. This way, the computing system may avoid spending resources (e.g., time, power) testing edge points positioned at distances away from the line model that likely do not represent the same edge in the environment as the line model.

After a number of iterations attempting to fit edge points to a given line model and refining the position of the line model through the different attempts, the computing system may add the line segment model to a set of line segments if the line segment model includes a high number of inlier edge points. Additionally, the computing system may be configured to also remove the edge points found to make up the line segment from a set of remaining candidate edge points used to identify other line segments. The computing system may be configured to continue seeking to fit line models on remaining edge points until stopping line detection if the cardinality of available edge points falls below a minimum number of points per edge or if no more lines can be found.

Figure 8B:
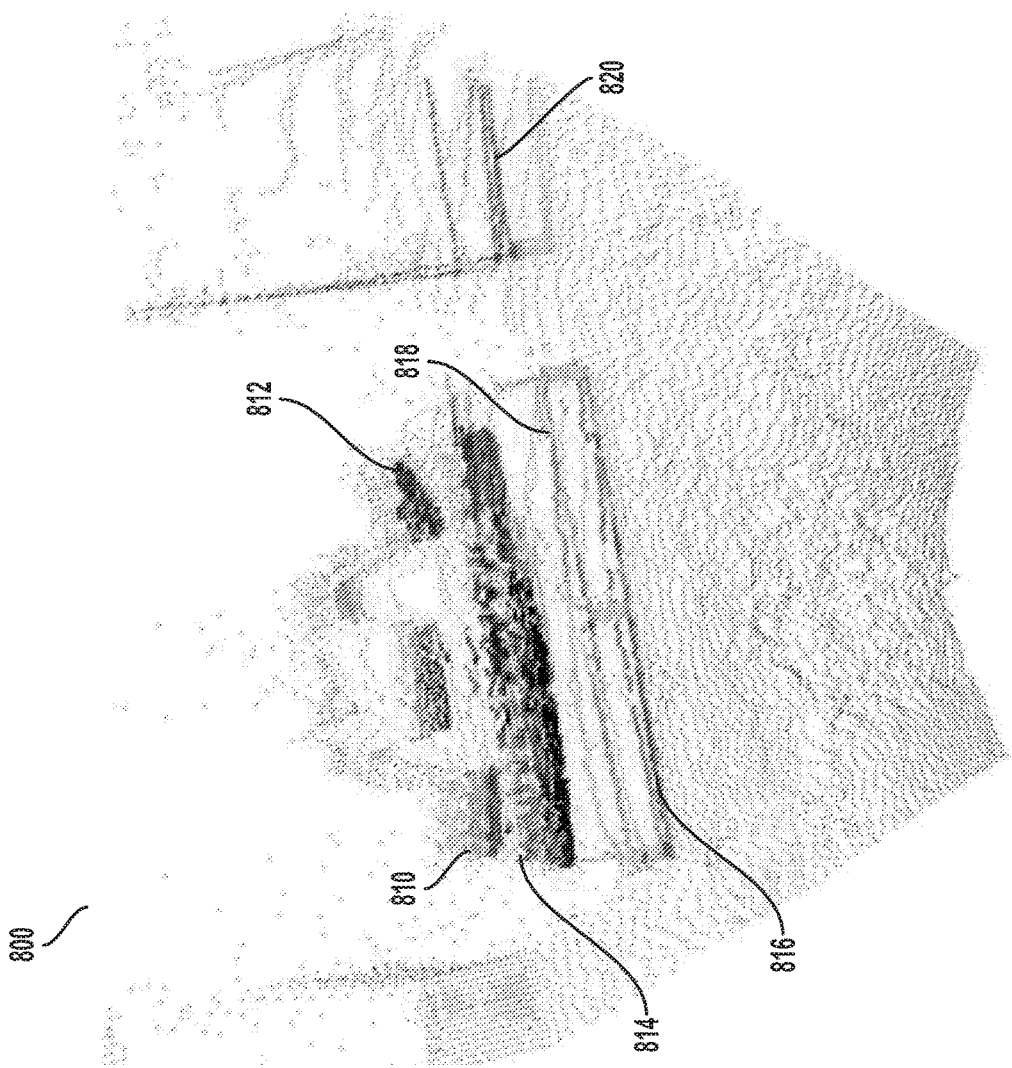
FIG. 8B illustrates a visualization of a set of line segments determined from an identified set of edge points by a computing system, in accordance with an example embodiment.

FIG. 8B illustrates a visualization of a set of line segments determined from an identified set of edge points by a computing system, in accordance with an example embodiment. As shown in sensor data 800 previously depicted in FIG. 8A, the computing system may analyze edge points previously identified (as shown in FIG. 8A) to fit line segments upon sets of the edge points that appear to align and form edges of surfaces in the environment. Particularly, a computing system may fit line segments 810, 812, 814, 816, 818, 820 to various clusters of identified edge points using line segment fitting processes, such as the iterative approach described above. The line segments may potentially represent the edges of surfaces in the environment, including edges of the targeted pallet.

Referring back to FIG. 7, method 700 at block 708 may include filtering the set of line segments to exclude line segments that have a length outside a height range and a width range associated with dimensions of a pallet template. The computing system may further process the set of identified line segments to remove line segments that likely do not represent edges of the targeted pallet. In some instances, the computing system may utilize knowledge of dimensions of typical pallets and/or a general position of the targeted pallet when filtering line segments to reduce the overall number of line segments available for testing for alignment with a pallet template. For instance, the computing system may remove line segments that are located at heights, positions, or orientations that likely do not mirror the targeted pallet's actual position and orientation.

In some examples, the computing system may remove line segments that have orientations that likely do not align with the orientation of a pallet in the environment. For instance, line segments with an angular orientation (e.g., 45 degrees) may be removed from the set of line segments since a pallet likely does not have angular edges. Rather, a pallet may likely include horizontal and vertical edges, such as the edges shown in the example pallets 606, 608 depicted in FIG. 4. Additionally, the computing system may also remove line segments from the potential line segments that may represent edges of a pallet in the environment based on the lengths of the line segments. For instance, the computing system may remove line segments that have a length less than a minimum desired length (e.g., a minimum length threshold). Similarly, the computing system may remove line segments that have a length greater than a maximum desired length (e.g., a maximum length threshold). The computing system may be configured to filter the set of line segments based on lengths to eliminate line segments with lengths that fall outside the range of lengths associated with the border and inner pockets of a pallet. Within other examples, the computing system may filter the set of line segments using other information as well.

Figure 8C:
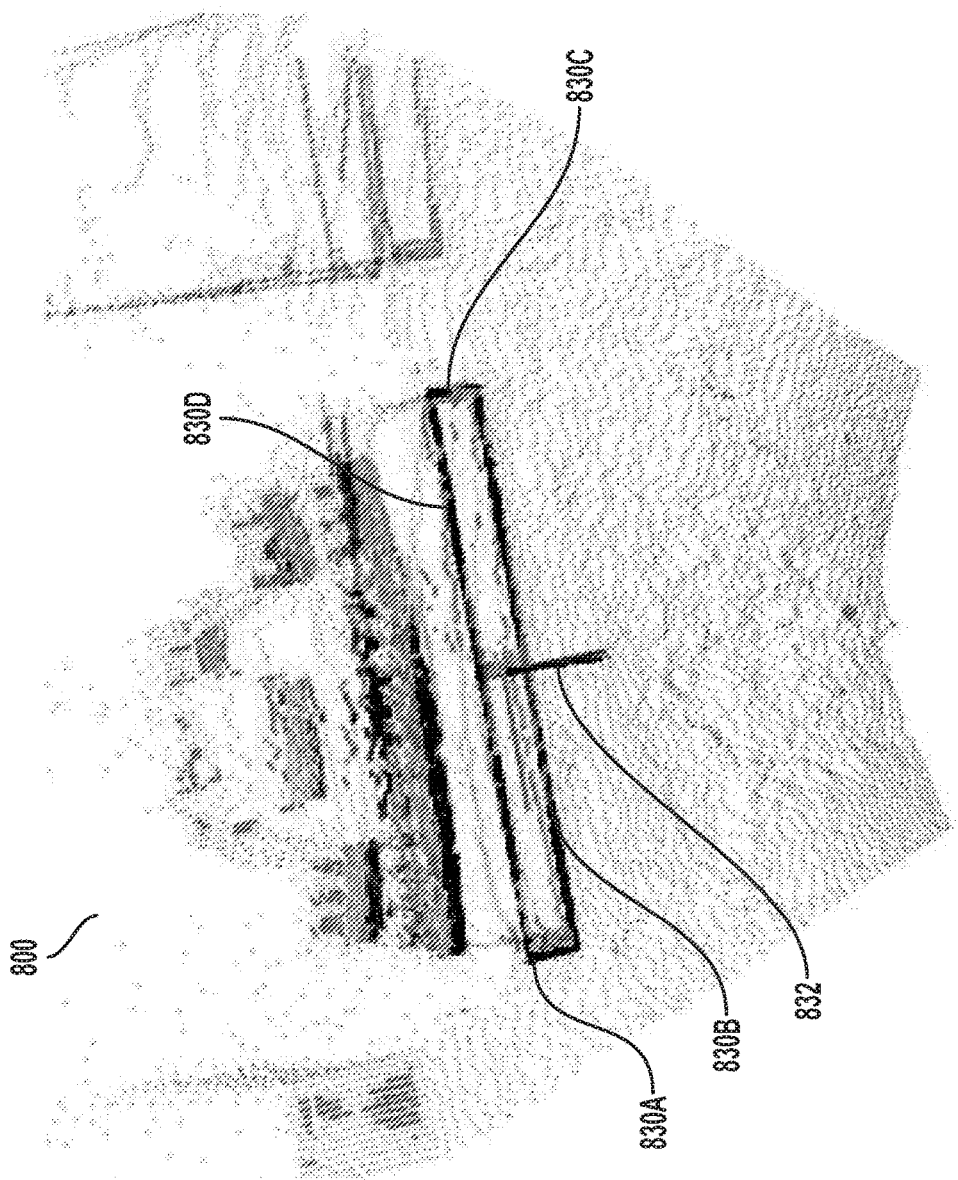
FIG. 8C illustrates a visualization of a set of line segments filtered to exclude line segments based on the dimensions of a pallet template by a computing system, in accordance with an example embodiment.

FIG. 8C illustrates a visualization of a set of line segments filtered to exclude line segments based on the dimensions of a pallet template by a computing system, in accordance with an example embodiment. As shown, the computing system may remove some of the line segments fitted to edge points in sensor data 800 that were identified in FIG. 8B to reduce the number of potential line segments that the computing system may attempt to use to match to one or more pallet templates. For instance, the computing system may reduce the set of line segments previously determined as shown in FIG. 8B resulting in a subset of line segments comprising 830A, 830B, 830C, 830D, and 832 that have lengths that appear to fit within a range of lengths based on dimensions of a pallet template. As a result, the computing system may process the subset of line segments to localize and determine a pose of the targeted pallet.

Referring back to FIG. 7, method 700 at block 710 may include identifying, from the filtered set of line segments, a subset of line segments that align with the pallet template. In order to potentially detect the presence of a pallet in the environment, the computing system may utilize and attempt to align one or multiple pallet templates to sets of line segments fitted to previously identified edge points. For instance, FIG. 8D illustrates a visualization of a subset of line segments that align with the pallet template identified by a computing system, in accordance with an example embodiment. As shown, the computing system may utilize the relationship between line segments to determine that the line segments 840 in sensor data 800 that may potentially align with a pallet template. The computing system may use line segments 840 to determine a pose of the targeted pallet.

In some examples, in order to extract data points that were potentially measured from a pallet in the environment, the computing system may fit a line segment to the local minima (points in the virtual scan or the coordinates of occupied cells in the occupancy grid), fit lines segments as in the template—matching-based pipeline.

In an example implementation, in order to determine the pose of a targeted pallet, the computing system may sample sets of 2 to n line segments (where n is the number of line segments in pallet template) and the inlier edge points of the line segments, respectively, and match a superset of all inliers edge points of the line segments to points sampled from a pallet template (e.g., points extending along the dimensions of the pallet template). For instance, the computing system may apply an Iterative Closet Point (ICP) process to match the pallet template (sampled pallet template points d∈D) against the sampled line segments (sampled line segment points m∈M). In every iteration, the computing system may search for the closest neighbors in sampled template points D for sampled line segment points M. In some instances, the computing system may use the Euclidean point-to-point distance between pairs of corresponding points to compute the transformation (T*) aligning the pallet template to the sampled line segments as shown in equation [1] below.

$$T^* = \arg\min \Sigma_i \Sigma_j w_{ij} \| m_j - T(d_i) \|^2 \qquad [1]$$

The error functions may include all possible matching of a point d_i to a point m_i. As such, the matching step (neighbor search is encoded in the weight w_ij in a binary fasion: if m_j is the closet point to d_i, w_ij=1 and w_ij=0, otherwise. The error functions may also be rewritten as a sum over all n matches where each match is a pari (d_, m_j). A computing system may use various methods (depending on the type of error function) to solve equation [1]. For instance, the computing system may use closed form solutions for point-to-point analysis.

In some examples, the ICP process may include for each data point in a line segment, matching the closet point in the pallet template and estimating the combination of rotation and translation using a root mean square point to point distance metric minimization technique which will best align each data point in the line segment to its matching point in the pallet template after weighting and rejecting outlier points. The computing system may further perform the process by transforming the line segments points using the obtained transformation and repeating the process.

In some instances, the computing system may be configured to perform an actual matching in two-dimensions or 3D. In particular, the line segments determined by the computing system that have a length of the width of the pallet template may signal the pose of the pallet in the environment in 2D. In order to perform 3D matching, the computing system may extract all or a portion of 3D points that have an x and y coordinates close to line segment candidates and perform either a 3D registration again using interactive closest point process.

FIG. 9A illustrates example pallet template 900, which represents a potential pallet template that a computing system may attempt to fit to determined line segments to identify a location of a pallet in a robot's environment. As shown, pallet template 900 shows one type of configuration that a pallet may have and includes length 902 and height 904. These dimensions may vary with other example pallet templates. Pallet template 900 also includes pockets 906 that represent slots that a robot (e.g., forklift) may insert tines or other mechanical structures to engage and lift a pallet with such a configuration.

FIG. 9B illustrates another example pallet template 910, which represents another potential pallet template. As shown, pallet template 910 has length 912 and height 914, which can differ across various example implementations. Unlike pallet template 900, pallet template 910 does not include a bottom portion, but rather includes open pockets 916 that extend to a ground surface that a pallet configured as pallet template 900 may be placed upon. A computing system may use pallet template 900 and pallet template 910 to identify line segments that likely represent the pose of a targeted pallet in the environment.

Referring back to FIG. 7, at block 712, method 700 may include determining a pose of a pallet in the environment based on the identified subset of line segments. Upon identifying line segments that likely correspond to portions (e.g., edges) of a pallet, the computing system may analyze the relationship of the line segments and positions of the line segments relative to the robot to determine the pallet's pose. For instance, the computing system may analyze the depth and position of data points incorporated within the identified line segments to determine a position and an orientation of the pallet.

In some examples, the computing system may estimate the distance between a portion of the pallet (e.g., the pallet's pockets) and the robotic device. This way, the computing system may develop control instructions that specify a distance that the robotic device may need to travel before engaging the pallet. For example, the computing system may develop instructions that adjust an orientation of the robotic device relative to the pallet's pockets and further cause the robotic device to accurately insert mechanical components (e.g., tines) into the pockets.

In a further example implementation, method 700 may further include controlling a robotic device based on the pose of the pallet. In particular, in some cases, the computing system may correspond to the robot's control system and control the robotic device based on the pose of the pallet. For instance, the computing system may navigate the robotic device and cause the robotic device to safely engage the pallet by inserting its tines into the front pockets of the pallet. As a result, the computing system may further control the robotic device to transport the pallet and its contents to a desired location.

In another example implementation, the computing system may be configured to determine a confidence associated with the pose determination for the pallet. In particular, in addition to determining the pose of a pallet in the environment (e.g., the pose represented by the transform (T*)), the computing system may be configured to determine a confidence dependent on the overall alignment between the identified subset of line segments and the dimensions of the pallet template. For example, the computing system may determine a confidence based on the ratio of matching points between the subset of line segments and pallet template (e.g., data points within a small distance threshold corresponding to the expected noise level in this distance). When using a ratio of matching points, a large confidence close to 1 may suggest an accurate fit between the pallet template and subset of line segments while a small confidence may suggest a less accurate fit. In some cases, the confidence level determined by the computing system may signal that the pallet is not located at that position in the environment.

The computing system, in some examples, may be configured to perform one or multiple pre-processing operations using incoming sets of sensor data prior to performing edge point identification. The pre-processing operations may aim to reduce potential noise and other unwanted factors within the sensor data. For instance, the computing system may filter sensor data to exclude data points that appear to be statistical outliers. In other words, the computing system may remove data points that do not appear to fit with the rest of the incoming sensor data. The filter may reduce noise and remove other unwanted data points, such as data points that likely resulted from jump edges or other inconsistencies.

In addition to reducing noise within incoming sensor data, the computing system may also determine particular features utilizing the sets of sensor data (e.g., depth images, color images), such as local surface normal, curvature, and/or covariance of clusters of data points within the sensor data. A surface normal of a cluster of data points is a line (vector) that extends perpendicular to the local surface of the object(s) represented by the cluster of data points and can help determine the orientation of the measured surface. The curvature of a cluster of data points may indicate changes in orientation of the surface as well and the covariance may provide a measure of the strength of the correlation between data points in the cluster. As such, the computing system may use the above features to avoid errors that may arise when identifying edge points using depth discontinuities in the sensor data. For example, in some cases, the determined curvature and covariance of clusters of data points may help identify convex and concave edges where different surfaces of objects meet without clear depth discontinuities. The computing system may produce an edge point image using the various features and further process the edge point image to fit line segments to the edge points.

In another example, the computing system may identify the relative position of multiple pallets in front of the robot. For instance, the computing system may detect the presence of the pallets relative to the sensor (or robot device) and further focus upon a particular pallet to determine a control strategy for the robotic device.

Figure 10:
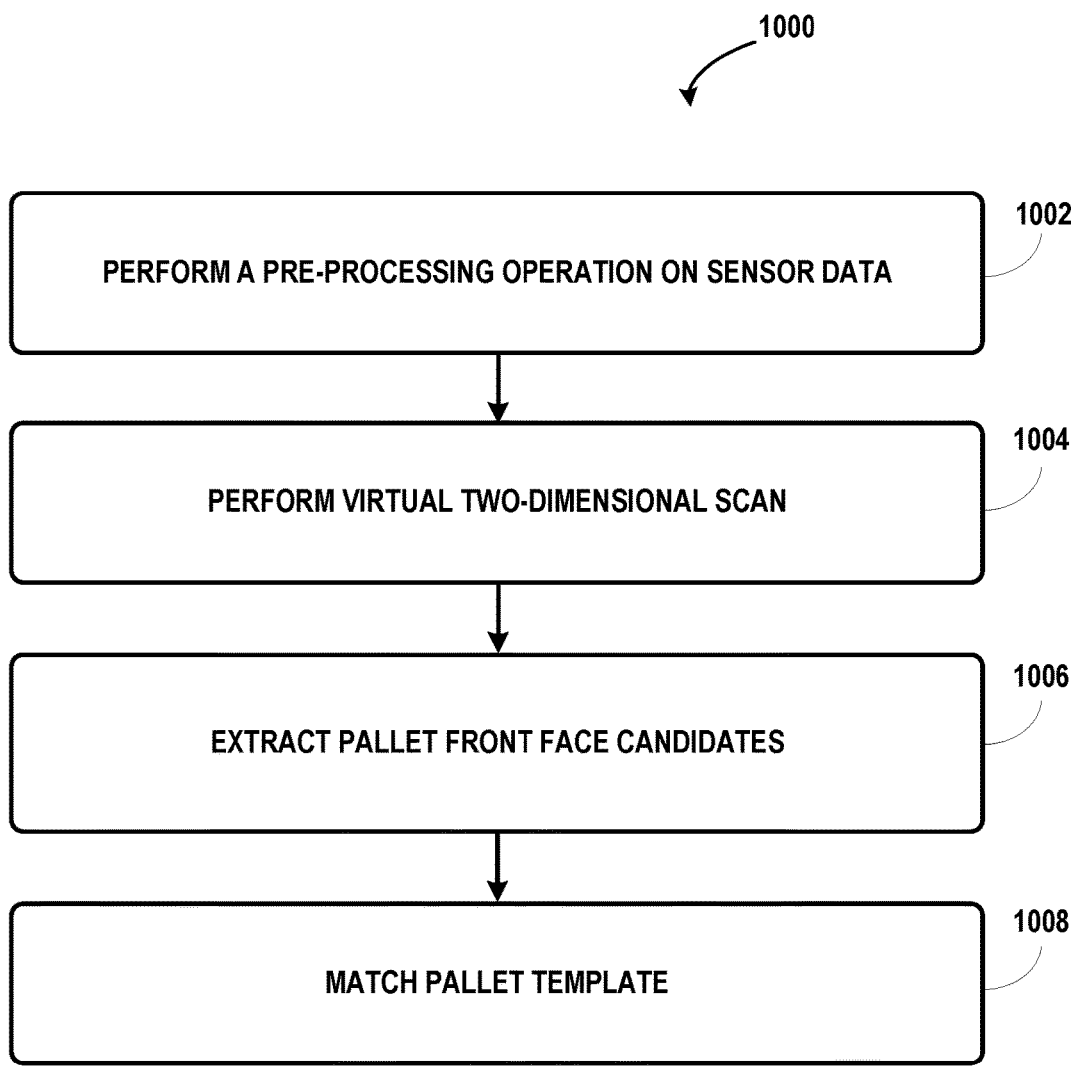
FIG. 10 is a flowchart that shows another example method for detecting, recognizing, and localizing pallets.

FIG. 10 is a flowchart illustrating another example method 1000, according to an example implementation. Similar to method 700, method 1000 includes several operations, functions, or actions as illustrated by one or more of blocks 1002, 1004, 1006, and 1008. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In some examples, a computing system may utilize method 1000 when the computing system has knowledge that a targeted pallet is both located on the ground and separated from other pallets. When a pallet is in such position in the robot's environment (i.e., positioned on the ground and clearly separated from other pallets), the computing system may use less computational resources to locate the pallet. For example, the computing system may initially identify data points that correspond to the ground below the potential pallet and then segment data points within sensor data that are located at heights corresponding to heights (e.g., height 704 of pallet template 700, height 714 of pallet template 710) typically associated with a pallet positioned on the ground. After segmenting data points within the height range associated with a pallet on the ground, the computing system may extract data points positioned closest to the robot (e.g., forklift) in an assumption that these data points likely represent the targeted pallet's front face. As such, the computing system may try to fit a pallet template to these extracted data points to locate and determine the targeted pallet's pose.

At block 1002, method 1000 may include performing a pre-processing operation on sensor data. In particular, as discussed above, a computing system may receive sensor data depicting an environment from sensor(s) coupled to a robot and perform one or multiple pre-processing operations upon sets of incoming sensor data, such as a least squares process or sample-consensus-based approach to fit a plane to the ground below the targeted pallet. A least squares process may involve estimating unknown parameters in a linear regression model with the goal of minimizing the sum of squares of the differences between data points in the sensor data and predicted data points associated with a linear function. A sample-consensus-based approach may involve fitting some model (e.g., line segment models) to data points in sensor data by selecting a random subset of the sensor data and fitting a model to the subset. The computing system may further test all other sensor data against the fitted model and determine the number of data points that appear to fit the estimated model. The computing system may further improve the model by refitting the model using the data points that previously appeared to fit the model.

The computing system may then transform data points within incoming sensor data sets into a local coordinate frame on the plane segment and segment all points above the ground plane as candidate data points that may potentially represent the targeted pallet. In a further example, the computing system may limit candidate data points within a given height range (amplitude range) above the ground plane as potential data points that may represent a pallet (e.g., data points above a first threshold height and below a second threshold height).

At block 1004, method 1000 may include performing a virtual two-dimensional scan. As indicated above, the computing system may assume that a pallet is generally positioned in front of the robot using one or multiple sensors coupled to the robot. Additionally, the computing system may determine that the pallet is not occluded by one or more objects by analyzing data points within sets of sensor data that are positioned closest to the robot and likely correspond to the targeted pallet. For instance, the computing system may compute a virtual 2D scan (i.e., a minimum distance for a discrete set of angles), and for data points above the ground plane, the computing system may compute the distance and the angle (i.e., the polar coordinates) in order to store the minimum distance per discretized angel in a lookup table. A virtual 2D scan represents down projection of 3D data points onto the ground plane and filtering the maximum and/or minimum distance to data points in every direction. By filtering minimum distances, the computing system may effectively create a 2D scan that includes all obstacles in front of the robot above the ground.

In some examples, the computing system may be configured to determine a local egocentric occupancy grid and select the coordinates of occupied cells. An egocentric occupancy grid map is a grid map (e.g., a matrix) in which each cell is either "free" or "occupied". A cell is free when the computing system has identified an obstacle, wall, or something else behind the cell and has further in principle looked through it. On the other hand, a cell is occupied when the computing system has seen something in the cell. A cell may also be "unknown" when the computing system has yet to determine if the cell is occupied by an obstacle or clear.

In some implementations, an occupancy grid may correspond to a top-down map of the environment where walls and racks are black/occupied, floor is white/free, and areas outside are gray/unknown. For instance, an egocentric occupancy grid may have a robot in the center of the map enabling a control system of the robot to find the closet obstacles around the robot in the plane that the robot is operating on (e.g., on the ground surface).

The computing system may perform the above processes to detect the closest objects positioned in front of the robot and to further initialize the search for a targeted pallet. In particular, a pallet (and items positioned on top of the pallet) may show up as a line in the egocentric map or in the 2D scan.

At block 1006, method 1000 may include extracting pallet front face candidates, which can involve the computing system attempting to fit line segments to local minima (i.e., data points in the virtual scan or the coordinates of occupied cells in the occupancy grid). The computing system may further fit line segments to points of one or multiple pallet templates. In some applications of method 1000 or similar methods, the computing system may be configured to ignore line segments with lengths below or above the expected pallet width.

At block 1008, method 1000 may include matching a pallet template. More specifically, the computing system may perform the matching in 2D or 3D depending on the acquired sensor data. In particular, the computing system may use detected line segments with a length of the expected pallet width to determine the pose of the pallet in 2D. For 3D matching, the computing system may extract all 3D sensor data points that have x and y coordinates close to the line segment candidates and perform a 3D registration using an iterative closest point process. The computing system may further compute its confidence by extracting the 3D points and finding matches between the pallet template and the data points. As such, a high confidence may suggest a good match and a low confidence may indicate that no pallet was found.

IV. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:
1. A method comprising:
receiving, at a computing system and from a sensor, sensor data representing aspects of an environment;
identifying a set of edge points in the sensor data, wherein identifying the set of edge points involves: (i) determining a first local surface normal relative to a surface represented in a cluster of data points in the sensor data and a second local surface normal relative to the surface represented in the cluster of data points, and (ii) identifying data points in the cluster of data points that correspond to edge points based on the first local surface normal and the second local surface normal;

determining a set of line segments from the set of edge points, wherein each line segment is fit to a subset of the set of edge points;

filtering the set of line segments to exclude line segments that have a length outside a height range and a width range associated with dimensions of a pallet template;

identifying, from the filtered set of line segments, a subset of line segments that align with the pallet template; and determining a pose of a pallet in the environment based on the identified subset of line segments.

2. The method of claim 1, wherein receiving sensor data representing aspects of the environment comprises:
receiving depth images representing aspects of the environment from a depth sensor.

3. The method of claim 1, wherein identifying the set of edge points in the sensor data comprises:
determining covariance of data points in a cluster of data points in the sensor data; and
identifying data points in the cluster of data points that correspond to edge points based on the covariance of the data points.

4. The method of claim 1, wherein determining the set of line segments from the set of edge points comprises:
selecting a first edge point and a second edge point from the detected edge points;
estimating a line segment model that includes at least the first edge point and the second edge point;
modifying the line segment model based on an additional edge point located proximate to the line segment model; and
based on the modified line segment model, determining a line segment that includes the first edge point, the second edge point, and the additional edge point.

5. The method of claim 1, further comprising:
causing a robotic device to insert tines into pockets of the pallet; and
responsive to causing the robotic device to insert tines into pockets of the pallet, causing the robotic device to lift the pallet.

6. The method of claim 1, further comprising:
responsive to receiving sensor data representing aspects of the environment, performing a filter process to remove data points of the sensor data that represent surfaces at amplitudes outside a range of amplitudes associated with a pallet positioned on a ground surface.

7. The method of claim 1, wherein filtering the set of line segments to exclude line segments that have a length outside a height range and a width range associated with dimensions of a pallet template comprises:
determining an orientation of a line segment of the set of line segments;
based on the orientation of the line segment, determining whether a length of the line segment is outside either the height range or the width range associated with the dimensions of the pallet template; and
based on determining that the length of the line segment is outside either the height range or the width range, modifying the set of line segments to exclude the line segment.

8. The method of claim 1, wherein identifying, from the filtered set of line segments, the subset of line segments that align with the pallet template comprises:
determining the subset of line segments that align with the dimensions of the pallet template using a registration process.

9. The method of claim 1, further comprising:
determining a confidence level associated with an alignment of the subset of line segments with the dimensions of the pallet template; and
based on the confidence level, determining a control strategy for a robotic device using the pose of the pallet.

10. The method of claim 1, wherein determining the pose of the pallet in the environment based on the identified subset of line segments comprises:
determining a distance and a relative position of the pallet from the sensor; and
determining an orientation of the pallet relative to the sensor.

11. A robotic device, comprising:
a sensor coupled to the robotic device; and
a control system configured to;
receive sensor data representing aspects of an environment, wherein the sensor data includes depth measurements of the environment from a three-dimensional (3D) camera;
identify a set of edge points in the sensor data, wherein identifying the set of edge points in the sensor data involves: (i) determining a cluster of local neighborhood data points in an depth image from the 3D camera, (ii) determining depth measurements of data points in the cluster of local neighborhood data points, and (iii) identifying data points of the cluster of local neighborhood data points that correspond to edge points based on the determined depth measurements;
determine a set of line segments from the set of edge points, wherein each line segment is fit to a subset of the set of edge points;
filter the set of line segments to exclude line segments that have a length outside a height range and a width range associated with dimensions of a pallet template;
identify, from the filtered set of line segments, a subset of line segments that align with the pallet template; and
determine a pose of a pallet in the environment based on the identified subset of line segments.

12. The system of claim 11, wherein the robotic device is an autonomous robotic forklift.

13. The system of claim 11, wherein the sensor data includes a color image from a set of stereo cameras, and
wherein the control system is configured to convert the color image into a grayscale image to identify the set of edge points in the sensor data.

14. The system of claim 11, wherein the sensor data includes a depth image from a 3D camera, and
wherein the control system is further configured to:
determine a cluster of local neighborhood data points in the depth image;
determine depth measurements corresponding to data points in the cluster of local neighborhood data points; and
identify data points of the cluster of local neighborhood data points that correspond to edge points based on the determined depth measurements.

15. A non-transitory computer readable medium having stored therein program instructions executable by a computing system to cause the computing system to perform operations, the operations comprising:
receiving sensor data representing aspects of an environment;

identifying a set of edge points in the sensor data, wherein identifying the set of edge points involves: (i) determining a first local surface normal relative to a surface represented in a cluster of data points in the sensor data and a second local surface normal relative to the surface represented in the cluster of data points, and (ii) identifying data points in the cluster of data points that correspond to edge points based on the first local surface normal and the second local surface normal;

determining a set of line segments from the set of edge points, wherein each line segment is fit to a subset of the set of edge points;

filtering the set of line segments to exclude line segments that have a length outside a height range and a width range associated with dimensions of a pallet template;

identifying, from the filtered set of line segments, a subset of line segments that align with the pallet template; and determining a pose of a pallet in the environment based on the identified subset of line segments.

16. The non-transitory computer readable medium of claim 15, the operations further comprising:
  causing a robotic device to lift the pallet and modify a position of the pallet.

17. The non-transitory computer readable medium of claim 15, wherein the width range is the width of the pallet template plus or minus a fixed error tolerance.

18. The non-transitory computer readable medium of claim 15, wherein the height range is the height of the pallet template plus or minus a fixed error tolerance.

* * * * *